(12) United States Patent
Kaneko

(10) Patent No.: US 12,444,160 B2
(45) Date of Patent: Oct. 14, 2025

(54) INFORMATION PROCESSING DEVICE, MONITORING SYSTEM, INFORMATION PROCESSING METHOD, AND NON-TRANSITORY COMPUTER-READABLE STORAGE MEDIUM

(71) Applicant: NEC Corporation, Tokyo (JP)

(72) Inventor: Akihiro Kaneko, Tokyo (JP)

(73) Assignee: NEC CORPORATION, Tokyo (JP)

( * ) Notice: Subject to any disclaimer, the term of this patent is extended or adjusted under 35 U.S.C. 154(b) by 525 days.

(21) Appl. No.: 17/801,300

(22) PCT Filed: Jan. 14, 2021

(86) PCT No.: PCT/JP2021/001032
§ 371 (c)(1),
(2) Date: Aug. 22, 2022

(87) PCT Pub. No.: WO2021/186866
PCT Pub. Date: Sep. 23, 2021

(65) Prior Publication Data
US 2023/0089155 A1 Mar. 23, 2023

(30) Foreign Application Priority Data
Mar. 19, 2020 (JP) ................................. 2020-048579

(51) Int. Cl.
*G06K 9/00* (2022.01)
*G06V 10/34* (2022.01)
(Continued)

(52) U.S. Cl.
CPC .............. *G06V 10/34* (2022.01); *G06V 20/52* (2022.01); *G06V 40/172* (2022.01); *G06V 40/174* (2022.01); *G06V 40/20* (2022.01)

(58) Field of Classification Search
None
See application file for complete search history.

(56) References Cited

U.S. PATENT DOCUMENTS

| | | | |
|---|---|---|---|
| 2006/0028488 A1* | 2/2006 | Gabay | H04L 65/764 |
| | | | 345/626 |
| 2015/0063640 A1 | 3/2015 | Anabuki | |
| 2017/0108236 A1* | 4/2017 | Guan | F24F 11/79 |

FOREIGN PATENT DOCUMENTS

| | | |
|---|---|---|
| JP | 2008-152328 A | 7/2008 |
| JP | 2009-225398 A | 10/2009 |

(Continued)

OTHER PUBLICATIONS

International Search Report for PCT Application No. PCT/JP2021/001032, mailed on Mar. 30, 2021.
(Continued)

*Primary Examiner* — Wei Wen Yang
(74) *Attorney, Agent, or Firm* — Sughrue Mion, PLLC

(57) ABSTRACT

One purpose of the present invention is to provide a technology which can protect privacy and present a valid image when monitoring a person. This information processing device according to one aspect of the present disclosure is provided with: an action detection means which detects an action of a person included in imaged data; an emotion detection means which detects the emotion of the person; a suspiciousness calculation means which calculates suspiciousness indicating a required degree of monitoring of the person, on the basis of the action and emotion of the detected person; a mask processing means which performs, on the basis of the calculated suspiciousness, mask processing for reducing, in the imaged data, an information amount of a region in which the person is imaged.

8 Claims, 20 Drawing Sheets

(51) Int. Cl.
    *G06V 20/52*     (2022.01)
    *G06V 40/16*     (2022.01)
    *G06V 40/20*     (2022.01)

(56) References Cited

FOREIGN PATENT DOCUMENTS

| | | |
|---|---|---|
| JP | 2010-033285 A | 2/2010 |
| JP | 5159381 B2 | 3/2013 |
| JP | 2015-046732 A | 3/2015 |
| JP | 2019-106631 A | 6/2019 |
| JP | 2020-022097 A | 2/2020 |

OTHER PUBLICATIONS

English translation of Written opinion for PCT Application No. PCT/JP2021/001032, mailed on Mar. 30, 2021.
JP Office Communication for JP Application No. 2022-508085, mailed on Nov. 14, 2023 with English Translation.

\* cited by examiner

Fig. 3

| IDENTIFICATION INFORMATION | ACTION | EMOTION |
|---|---|---|
| A | WANDERING | CRYING |
| B | WALKING | CALM |
| C | WALKING | ANGRY |

Fig. 4

| IDENTIFICATION INFORMATION | DEGREE OF SUSPICIOUSNESS |
|---|---|
| A | 0.8 |
| B | 0 |
| C | 0.5 |

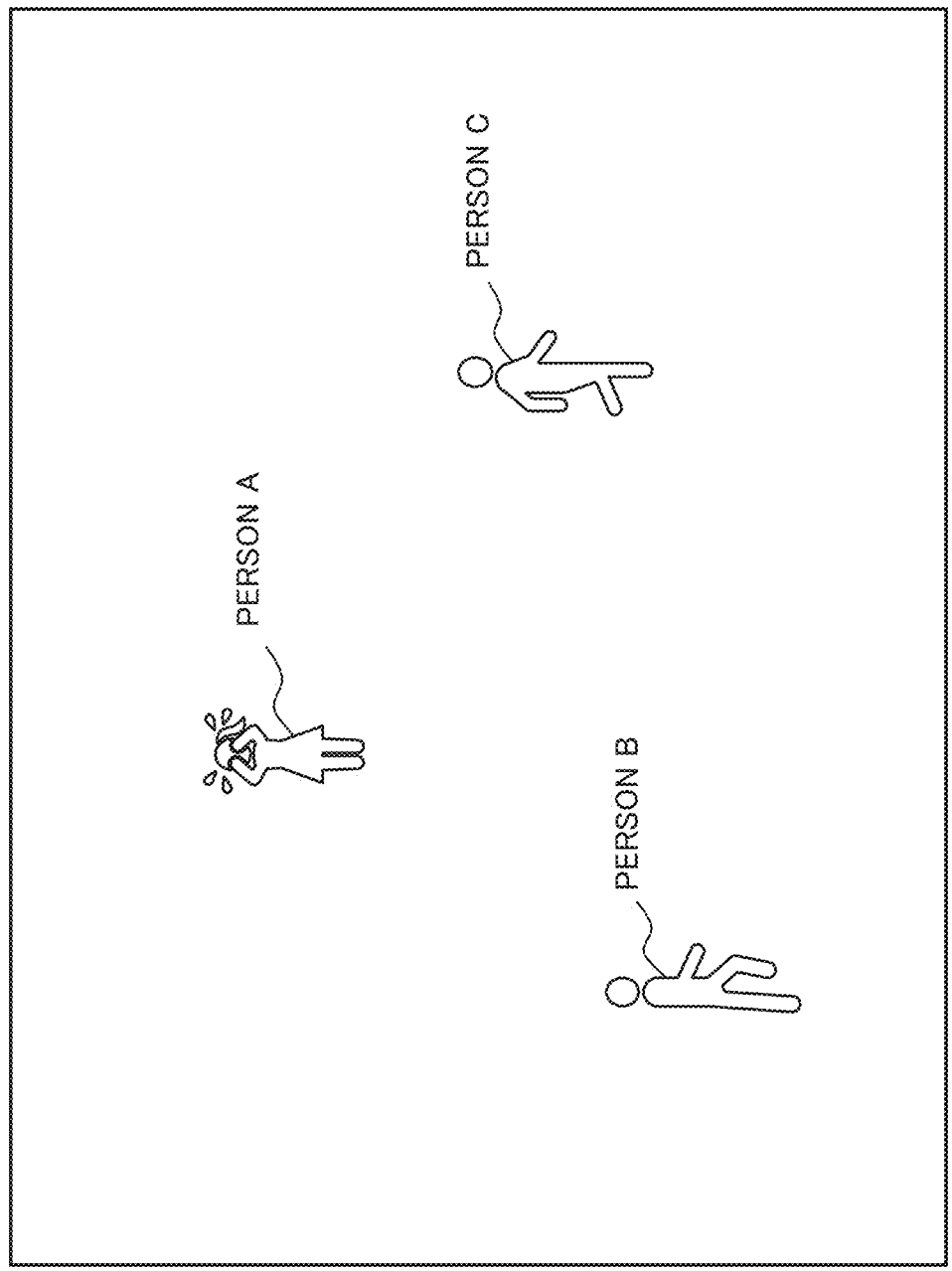

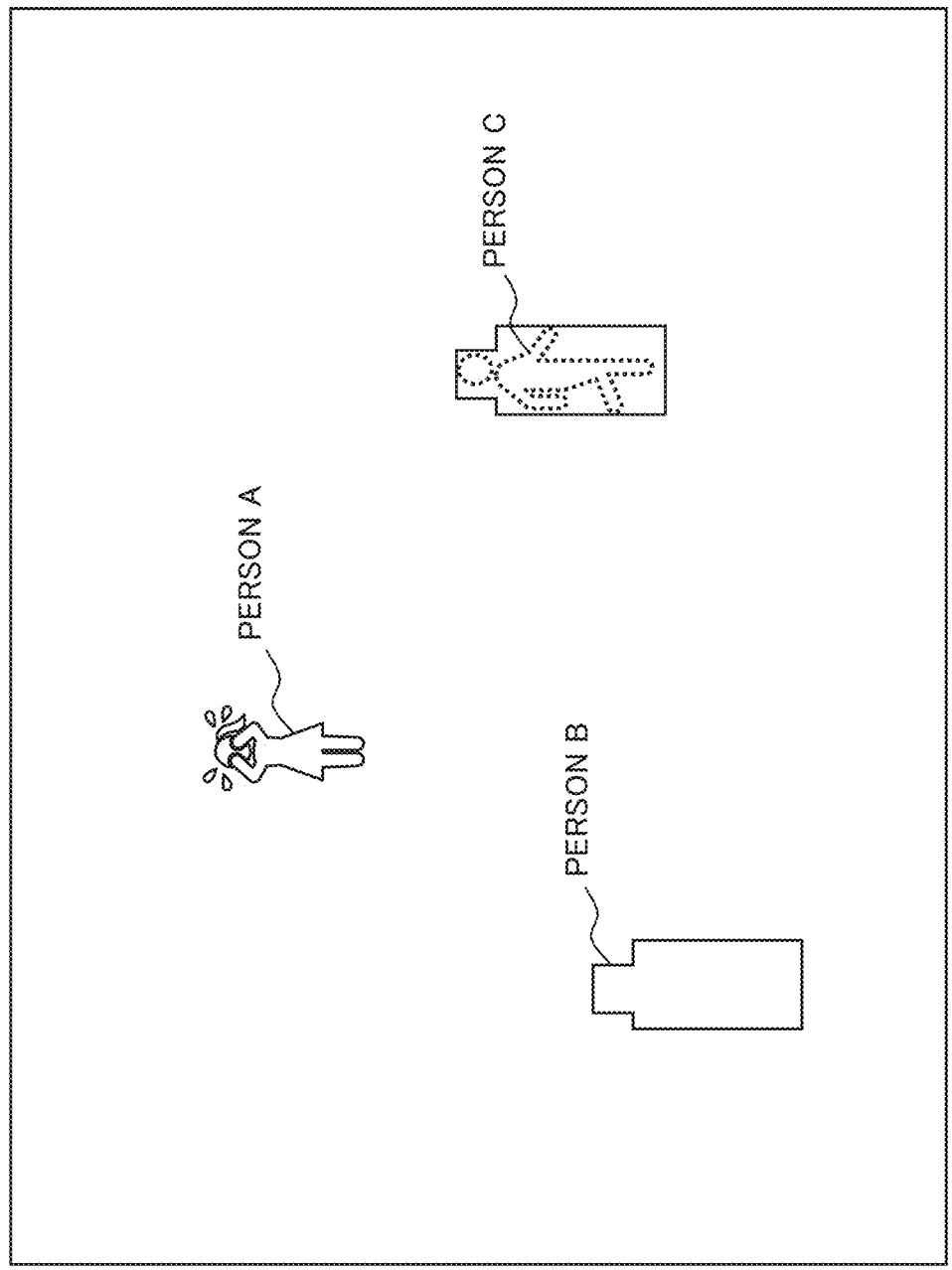

Fig. 13

| IDENTIFICATION INFORMATION | ACTION | EMOTION | ATTRIBUTE | |
| --- | --- | --- | --- | --- |
| | | | SEX | AGE |
| A | WANDERING | CRYING | FEMALE | UNDER AGE OF 10 |
| B | WALKING | CALM | MALE | 20S |
| C | WALKING | ANGRY | MALE | 30S |

INFORMATION PROCESSING DEVICE, MONITORING SYSTEM, INFORMATION PROCESSING METHOD, AND NON-TRANSITORY COMPUTER-READABLE STORAGE MEDIUM

This application is a National Stage Entry of PCT/JP2021/001032 filed on Jan. 14, 2021, which claims priority from Japanese Patent Application 2020-048579 filed on Mar. 19, 2020, the contents of all of which are incorporated herein by reference, in their entirety.

TECHNICAL FIELD

The present disclosure relates to a technology for monitoring a person.

BACKGROUND ART

A known technology is the technology for detecting a person who acts suspicious by using a monitoring video captured by a monitoring camera and monitoring the detected person.

PTL 1 discloses a technology for detecting a group including persons appearing in a monitoring video and detecting a suspicious person based on a distance between the persons in the detected group.

Here, unspecified persons may appear in the monitoring video. Since information on the appearance and action of the person included in the video is personal information, it is required for a surveillance staff monitoring the monitoring video to perform display in consideration of privacy protection. In this regard, there is a technology for protecting privacy when monitoring a person.

PTL 2 discloses a technology for, when a registered person is included in a monitoring video at the time of displaying the monitoring video, extracting a region where the person appears, and combining and displaying a foreground image which is an image of the extracted region with a background image in which the person does not appear. At this time, in a case where an unregistered person is included in the monitoring video, an image obtained by performing mask processing on the foreground image in which the person appears is combined with the background image and displayed.

CITATION LIST

Patent Literature

[PTL 1] JP 2019-106631 A
[PTL 2] JP 5159381 B2

SUMMARY OF INVENTION

Technical Problem

As described above, in a case where monitoring is performed using a monitoring video subjected to the mask processing in consideration of privacy protection, it may be difficult for a surveillance staff who monitors the monitoring video to perform monitoring. For example, in a case where there is a suspicious person, the surveillance staff needs to identify the person. However, in a case where the mask processing has been performed on the monitoring video, identifying the person may be difficult. In such a case, it is conceivable to cancel the mask processing only for a region of the suspicious person in the monitoring video on which the mask processing has been performed.

However, in a case where an accurate detection is not performed whether a person appearing in the monitoring video is a suspicious person, privacy may be violated when the mask processing is canceled. PTL 2 describes that the degree of suspiciousness of an unregistered person is determined according to a residence time of the person and the transparency of the foreground image is changed. However, the accurate determination may be not performed whether the person is a suspicious person by only information on the residence time.

The present disclosure has been made in view of the above problems, and an object of the present disclosure is to provide a technology capable of providing an effective video when monitoring a person while protecting privacy.

Solution to Problem

An information processing device according to one aspect of the present disclosure includes: action detection unit that detects an action of a person included in imaging data; emotion detection unit that detects an emotion of the person; suspiciousness degree calculation unit that calculates the degree of suspiciousness indicating the degree of necessity of monitoring of the person, based on the detected action and the detected emotion of the person; and mask processing unit that performs, based on the calculated degree of suspiciousness, mask processing being processing of reducing the amount of information of a region where the person appears in the imaging data.

An information processing method according to one aspect of the present disclosure includes: detecting an action of a person included in imaging data; detecting an emotion of the person; calculating the degree of suspiciousness indicating the degree of necessity of monitoring of the person, based on the detected action and the detected emotion of the person; and performing, based on the calculated degree of suspiciousness, mask processing being processing of reducing the amount of information of a region where the person appears in the imaging data.

A non-transitory computer-readable storage medium according to one aspect of the present disclosure stores a program for causing a computer to execute: processing of detecting an action of a person included in imaging data; processing of detecting an emotion of the person; processing of calculating the degree of suspiciousness indicating the degree of necessity of monitoring of the person, based on the detected action and the detected emotion of the person; and processing of performing, based on the calculated degree of suspiciousness, mask processing being processing of reducing the amount of information of a region where the person appears in the imaging data.

Advantageous Effects of Invention

According to the present disclosure, it is possible to provide an effective video when monitoring a person while protecting privacy.

BRIEF DESCRIPTION OF DRAWINGS

FIG. 3 is a diagram illustrating an example of detection data according to the first example embodiment.

FIG. 4 is a diagram illustrating an example of suspiciousness degree data according to the first example embodiment.

FIG. 8A is a diagram illustrating an example of imaging data according to the first example embodiment.

FIG. 8B is a diagram illustrating an example of processed imaging data according to the first example embodiment.

FIG. 13 is a diagram illustrating an example of detection data according to the fourth example embodiment.

EXAMPLE EMBODIMENT

Hereinafter, example embodiments according to the present disclosure will be described with reference to the drawings.

First Example Embodiment

A monitoring system including an information processing device according to a first example embodiment will be described.

Figure 1:
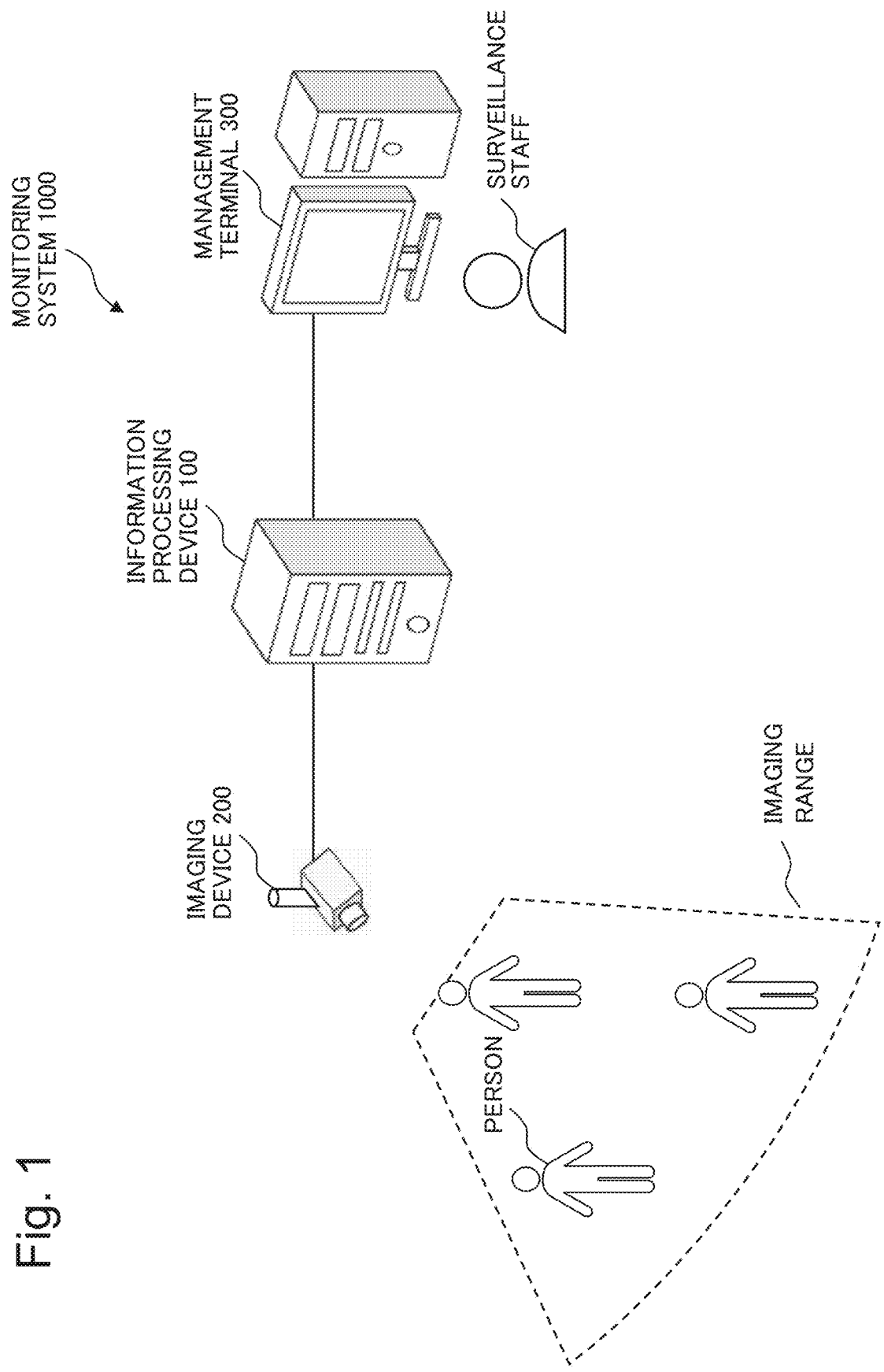
FIG. 1 is a diagram schematically illustrating an example of a configuration of a monitoring system according to a first example embodiment.

FIG. 1 is a diagram schematically illustrating an example of a configuration of a monitoring system 1000 according to the first example embodiment. As illustrated in FIG. 1, the monitoring system 1000 includes an information processing device 100, an imaging device 200, and a management terminal 300. The information processing device 100 is communicably connected to the imaging device 200 and the management terminal 300 via a network. Note that the monitoring system 1000 may include the information processing device 100 and the imaging device 200, and the monitoring system 1000 and the management terminal 300 may be communicably connected to each other.

The imaging device 200 images a range determined as an imaging range. In the situation illustrated in FIG. 1, since a range indicated by a dotted line is the imaging range and there is a person in the imaging range, a video captured by the imaging device 200 includes the person.

The video captured by the imaging device 200 may be each of a plurality of frames constituting a moving image, or may be each of still images captured at regular time intervals. In the present specification, the video captured by the imaging device 200 is referred to as "imaging data". The imaging data may include, in addition to pixel value data of the frame or the still image, a time when the imaging data is generated, information on a place where the imaging device 200 that has generated the imaging data is installed, and the like. The imaging device 200 sequentially transmits the generated imaging data to the information processing device 100.

Once the imaging data is acquired from the imaging device 200, the information processing device 100 processes the imaging data, that is, performs processing for protecting privacy on the imaging data. The information processing device 100 transmits the processed imaging data to the management terminal 300. In the present specification, the processing of processing the imaging data is also referred to as "image processing", and the imaging data subjected to the image processing is also referred to as "processed imaging data".

The management terminal 300 is a device including input/output means configured to communicate with the information processing device 100 via a network. For example, the management terminal 300 is a personal computer. The management terminal 300 acquires the processed imaging data from the information processing device 100, and displays the processed imaging data on a display unit (for example, a display device) 310. In the situation illustrated in FIG. 1, the management terminal 300 is used by a surveillance staff. The surveillance staff monitors the imaging range imaged by the imaging device 200 by using the processed imaging data displayed on the management terminal 300. At this time, once an abnormality is recognized, for example, the surveillance staff can issue an instruction to a security guard near the imaging range to confirm the abnormality.

That is, the monitoring system 1000 according to the first example embodiment is a system in which the information processing device 100 performs the image processing on the imaging data captured by the imaging device 200, and the processed imaging data is displayed on the management terminal 300.

An example in which the information processing device 100 and the management terminal 300 are different devices is described in the first example embodiment, but the information processing device 100 and the management terminal 300 may be an integrated device.

Figure 2:
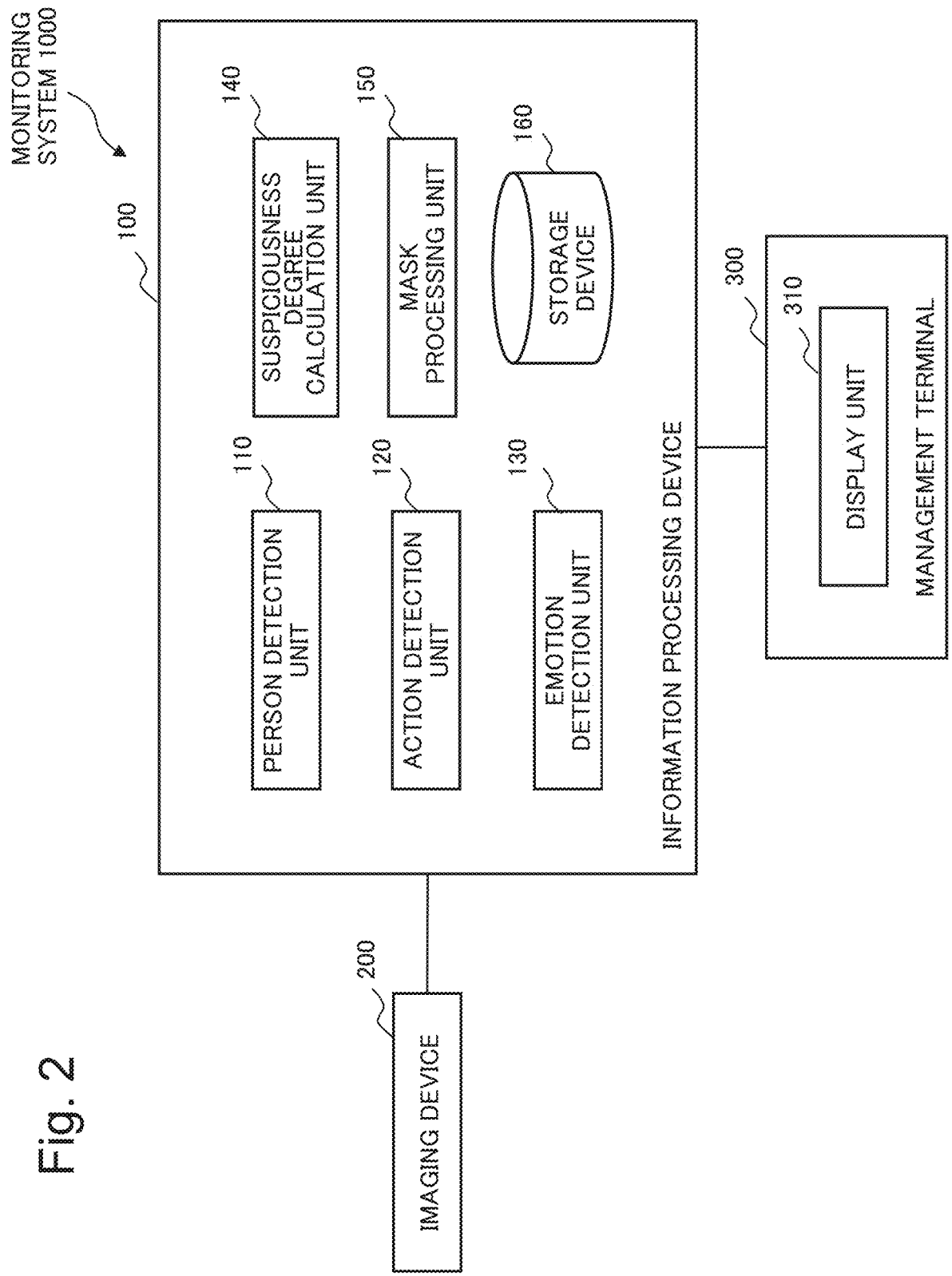
FIG. 2 is a block diagram illustrating an example of a functional configuration of an information processing device according to the first example embodiment.

[Details of Information Processing Device 100] Next, details of the information processing device 100 will be described. FIG. 2 is a block diagram illustrating an example of a functional configuration of the information processing device 100 according to the first example embodiment. As illustrated in FIG. 2, the information processing device 100 includes a person detection unit 110, an action detection unit 120, an emotion detection unit 130, a suspiciousness degree calculation unit 140, and a mask processing unit 150. Furthermore, the information processing device 100 includes a storage device 160.

Once the imaging data captured by the imaging device 200 is acquired, the person detection unit 110 detects a person included in the imaging data. As a person detection method, it is conceivable to use a method of detecting a person based on a difference between a plurality of pieces of imaging data by using time-series imaging data, that is, a background difference method, but the person detection method is not limited to this example. The person detection method may be, for example, a method of detecting a human shape from the imaging data, or may be various other known methods.

The person detection unit 110 generates identification information for identifying a person for each detected person. The person detection unit 110 stores the identification information in the storage device 160. In a case where a person detected in a previous frame is detected in a certain frame, the same identification information is assigned to the person (that is, the same identification information is assigned to the same person). At this time, the person detection unit 110 may determine the same person based on a feature amount of the person, or may determine the same person based on position information of the detected person.

The action detection unit 120 detects an action of the person detected by the person detection unit 110 from the imaging data. For example, the action detection unit 120 detects a motion such as "running", "walking", or "stopping" as the action of the person based on a change in position of the person on the imaging data by using the time-series imaging data. At this time, the action detection unit 120 may specify a portion of the detected person, and detect a motion such as "lying down" and "waving a hand" based on a position of the specified portion and a change of the position. In a case where a person appears at the same place a plurality of times within a preset time after the person is detected, the action detection unit 120 may detect "wandering" as the action of the person. The action detection method is not limited to this example. In this manner, the action detection unit 120 detects the action of the person included in the imaging data. The action detection unit 120 is an example of action detection means.

Once the action of the person is detected, the action detection unit 120 stores information indicating the detected action and the identification information of the person in the storage device 160 in association with each other.

The method of detecting the action of the person from the imaging data may be, for example, a method of performing detection by pattern matching between a region where the person appears in the imaging data and an image that is registered in an image database and is associated with information indicating the action of the person. At this time, the image database is stored in the storage device 160 in advance. The method of detecting the action of the person from the imaging data may be a method of extracting the feature amount of the person from the region where the person appears in the imaging data, and outputting an action relevant to the feature amount of the person by using a learning model using the extracted feature amount as an input. The learning model used here is, for example, a model that learns a relationship between the extracted feature amount of the person and the action of the person. The learning model is, for example, a regression equation derived by performing regression analysis with the feature amount of the person as an explanatory variable and a value indicating the action of the person as an objective variable, but is not limited to this example. For example, the learning model may be generated by a machine learning algorithm such as a support vector machine (SVM), a neural network, or a random forest.

The emotion detection unit 130 detects an emotion of the person detected by the person detection unit 110 from the imaging data. For example, the emotion detection unit 130 detects a feature amount from a region where the face of the person included in the imaging data appears. The emotion detection unit 130 detects the emotion based on the detected feature amount and data indicating a relationship between the feature amount and the emotion. The data indicating the relationship between the feature amount and the emotion is stored in the storage device 160 in advance. The emotion to be detected is a predetermined characteristic emotion such as "happy", "angry", "sad", "enjoying", "irritated", or "nervous". In a case where the characteristic emotion cannot be detected from the detected person, the emotion detection unit 130 may detect "calm" indicating that the person is calm. The emotion detection unit 130 may detect a motion caused by the emotion, such as "laughing" or "crying". These are examples of the emotion to be detected, and emotions other than these may be detected. The emotion detection unit 130 may detect the emotion of the person by using not only information obtained from the face of the person but also information on the motion detected by the action detection unit 120. In this manner, the emotion detection unit 130 detects an emotion of a person. The emotion detection unit 130 is an example of emotion detection means.

Once the emotion of the person is detected, the emotion detection unit 130 stores information indicating the detected emotion and the identification information of the person in the storage device 160 in association with each other.

The method of detecting the emotion of the person from the imaging data may be, for example, a method of performing detection by pattern matching between a region where the person appears in the imaging data and an image that is registered in an image database and is associated with information indicating the emotion of the person. At this time, the image database is stored in the storage device 160 in advance. The method of detecting the emotion of the person from the imaging data may be a method of extracting the feature amount of the person from the region where the person appears in the imaging data, and outputting an emotion relevant to the feature amount of the person by using a learning model using the extracted feature amount as an input. The learning model used here is, for example, a model that learns a relationship between the extracted feature amount of the person and the emotion of the person. The learning model is, for example, a regression equation derived by performing regression analysis with the feature amount of the person as an explanatory variable and a value indicating the emotion of the person as an objective variable, but is not limited to this example. For example, the learning model may be generated by a machine learning algorithm such as an SVM, a neural network, or a random forest.

FIG. 3 is a diagram illustrating an example of detection data stored in the storage device 160. The detection data is data in which the identification information detected by the person detection unit 110, the information indicating the action detected by the action detection unit 120, and the information indicating the emotion detected by the emotion detection unit 130 are associated with each other. For example, a record in the first row of FIG. 3 indicates detection data indicating that an action "wandering" is detected from a person whose identification information is "A", and an emotion "crying" is further detected.

The person detection unit 110, the action detection unit 120, and the emotion detection unit 130 perform detection processing as needed according to the imaging data sequentially transmitted from the imaging device 200. Therefore, the detection data is updated as needed.

The suspiciousness degree calculation unit 140 calculates the degree of suspiciousness based on the action of the person detected by the action detection unit 120 and the emotion of the person detected by the emotion detection unit 130. Here, the degree of suspiciousness is a value indicating the degree of necessity of monitoring of the detected person. For example, it can be determined that a person whose degree of suspiciousness is higher than a predetermined value is a monitoring target.

Specifically, the suspiciousness degree calculation unit 140 reads the information on the action of the person and the information on the emotion of the person associated with the identification information from the detection data stored in the storage device 160. The, the suspiciousness degree calculation unit 140 calculates the degree of suspiciousness of each person based on the read information on the action of the person and the read information on the emotion. In the present specification, the description will be given on the assumption that the degree of suspiciousness has a value in a range of 0 to 1, and a person whose degree of suspiciousness is closer to 1 is more likely to be the monitoring target, but the value of the degree of suspiciousness is not limited to this example.

A relationship among the action, the emotion, and the degree of suspiciousness of the person is set in advance by an administrator of the information processing device 100. However, the present disclosure is not limited thereto. For example, a prediction model for calculating the degree of suspiciousness may be generated in advance based on the detection data generated in the past, and the suspiciousness degree calculation unit 140 may calculate the degree of suspiciousness of the detected person by using the generated prediction model. At this time, regression analysis using each type of action to be detected and each type of emotion to be detected as explanatory variables and using the degree of suspiciousness as an objective variable may be performed to generate the prediction model. In this manner, the suspiciousness degree calculation unit 140 calculates the degree of suspiciousness being a value indicating the degree of necessity of monitoring of the person, based on the detected action and emotion of the person. The suspiciousness degree calculation unit 140 is an example of suspiciousness degree calculation means.

The suspiciousness degree calculation unit 140 may calculate the degree of suspiciousness by using information on a time when the person is detected in addition to the action and the emotion of the detected person. For example, in a case where the detected person is performing the action "wandering", the degree of suspiciousness may vary depending on the time when the person is detected. Therefore, the suspiciousness degree calculation unit 140 can calculate the degree of suspiciousness more accurately by taking the time information into consideration.

Once the degree of suspiciousness is calculated, the suspiciousness degree calculation unit 140 stores suspiciousness degree data in which the identification information and the degree of suspiciousness are associated with each other in the storage device 160. FIG. 4 is a diagram illustrating an example of the suspiciousness degree data according to the first example embodiment. The record in the first row of the suspiciousness degree data illustrated in FIG. 4 indicates that the degree of suspiciousness of the person whose identification information is "A" is "0.8".

The mask processing unit 150 performs the mask processing on the region where the person appears in the imaging data according to the degree of suspiciousness calculated by the suspiciousness degree calculation unit 140. Here, the mask processing refers to processing of reducing the amount of information of a processing target region in an image. In the present specification, the amount of information is an amount indicating details of features of an object (for example, a human) that can be recognized by the surveillance staff from the imaging data. That is, the processing of reducing the amount of information indicates processing of reducing the features of a person that can be recognized by a surveillance staff from imaging data. The mask processing may be processing of controlling the resolution of a region where a person appears, that is, the processing target region, or may be processing of replacing the positions of pixels in the processing target region. The mask processing may be processing of performing smoothing filtering on the processing target region, or may be processing of superimposing an image different from the original image, such as an avatar image (for example, a human shape illustration image or a character image), on the processing target region. By performing such processing, for example, it is possible to allow the surveillance staff to recognize only the presence of the person, recognize only the shape of the person, or recognize only the color of the clothes worn by the person or the color of the hair of the person. Furthermore, the mask processing unit 150 may perform processing of showing the identification information of the person on the processing target region subjected to the mask processing. As a result, in the imaging data subjected to the mask processing, the identification information of the person included in the imaging data can be presented to the surveillance staff.

Specifically, in a case where a person is detected from the imaging data acquired from the imaging device 200, the mask processing unit 150 reads information on the degree of suspiciousness calculated by the suspiciousness degree calculation unit 140 from the suspiciousness degree data stored in the storage device 160 by using the identification information of the detected person. The mask processing unit 150 determines whether the read degree of suspiciousness is equal to or higher than a threshold value for determining whether to perform the mask processing, and in a case where it is determined that the read degree of suspiciousness is lower than the threshold value, the mask processing unit performs the mask processing on a region where a person having identification information associated with the degree of suspiciousness that is lower than the threshold value appears. On the other hand, the mask processing unit 150 does not perform the mask processing on a region where a person whose degree of suspiciousness is equal to or higher than the threshold value appears. As described above, the mask processing unit 150 performs the mask processing being processing of reducing the amount of information of a region where a person appears in the imaging data, according to the calculated degree of suspiciousness. The mask processing unit 150 is an example of mask processing means.

The mask processing unit 150 may perform control to decrease the degree of reduction of the amount of information in the mask processing as the degree of suspiciousness increases. That is, as the degree of reduction of the amount of information in the mask processing decreases, the amount of information of the region subjected to the mask processing increases (that is, the amount of information approaches the amount of information of the original imaging data), and as the degree of reduction of the amount of information in the mask processing increases, the amount of information of the region subjected to the mask processing decreases. For example, in a case where the processing of controlling the resolution is adopted as the mask processing, processing of decreasing the degree of degradation in resolution is performed as the degree of reduction of the amount of information in the mask processing decreases. For example, in a case where processing of superimposing an image different from the original image is adopted as the mask processing, processing of making the superimposed image transparent is performed as the degree of reduction of the amount of information in the mask processing decreases.

The storage device 160 stores data generated by the information processing device 100 or data used by the information processing device 100. The storage device 160 may be included in the management terminal 300 or may be included in a device (not illustrated) communicably connected to the information processing device 100.

[Operation of Monitoring System 1000]

Next, an operation of the monitoring system 1000 will be described with reference to FIGS. 5, 6, and 7. In the operation described below, it is assumed that the monitoring system 1000 is constructed in the situation illustrated in FIG. 1. In the present specification, each step of the flowchart is expressed using a number assigned to each step, such as "S101".

Figure 5:
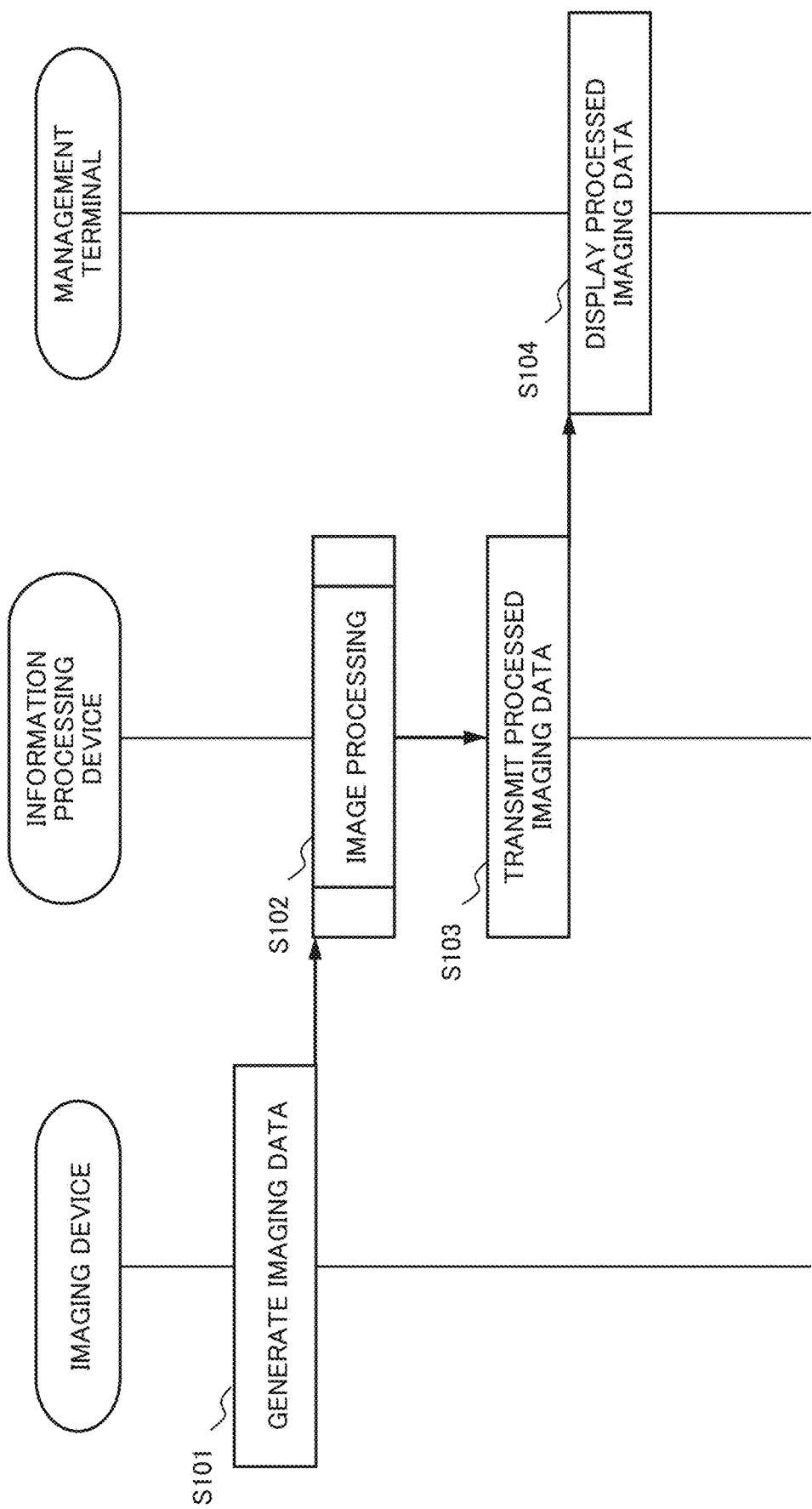
FIG. 5 is a sequence diagram for describing an example of an operation of the monitoring system according to the first example embodiment.

FIG. 5 is a sequence diagram for describing an operation of the monitoring system 1000. The imaging device 200 images the imaging range to generate the imaging data (S101). The imaging device 200 continues to generate the imaging data until there is an instruction to stop imaging, and sequentially transmits the generated imaging data to the information processing device 100.

Once the imaging data is acquired from the imaging device 200, the information processing device 100 performs processing on the acquired imaging data (S102).

Figure 6:
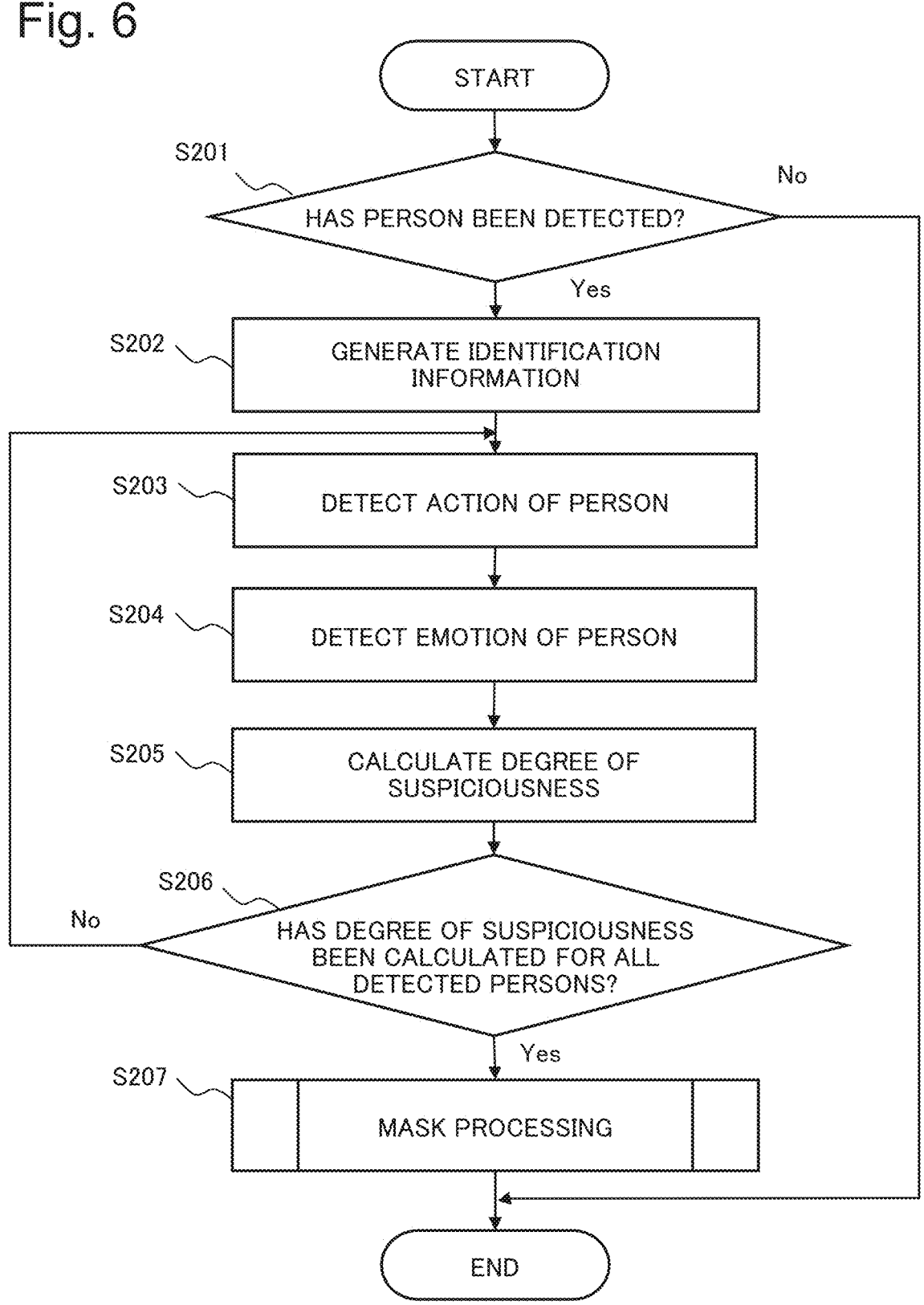
FIG. 6 is a flowchart illustrating an example of image processing according to the first example embodiment.

FIG. 6 is a flowchart illustrating an operation of the image processing performed by the information processing device 100. The person detection unit 110 of the information processing device 100 determines whether a person appears in the acquired imaging data, and in a case where a person appears, in other words, in a case where a person has been detected (Yes in S201), the person detection unit 110 generates the identification information of the detected person (S202). At this time, in a case where a plurality of persons have been detected, the person detection unit 110 generates the identification information for each detected person. Then, the person detection unit 110 stores the generated identification information in the storage device 160 as the detection data. In a case where no person has been detected (No in S201), the mask processing is not performed on the imaging data.

Once the processing of S202 is performed, the action detection unit 120 detects an action of the detected person from the imaging data (S203). The action detection unit 120 stores information indicating the detected action and the identification information of the detected person in association with each other in the storage device 160 as the detection data.

Next, the emotion detection unit 130 detects an emotion of the detected person from the imaging data (S204). The emotion detection unit 130 stores information indicating the detected emotion, the information indicating the action detected by the action detection unit 120, and the identification information of the detected person in association with each other in the storage device 160 as the detection data.

The suspiciousness degree calculation unit 140 reads the detection data from the storage device 160, and calculates the degree of suspiciousness of the person detected from the imaging data by using the read detection data (S205). Here, there may be a person for which at least one of information indicating an action and information indicating an emotion in the detection data has not been detected. In this case, there is a possibility that the degree of suspiciousness cannot be accurately calculated, and thus the mask processing is not performed. However, the suspiciousness degree calculation unit 140 may set the degree of suspiciousness to a certain value (for example, 0) so that the mask processing is also performed on such a person. The suspiciousness degree calculation unit 140 stores the calculated degree of suspiciousness and the identification information of the person relevant to the calculated degree of suspiciousness in association with each other in the storage device 160 as the suspiciousness degree data.

Thereafter, in a case where the degree of suspiciousness has not been calculated for all the detected persons (No in S206), the information processing device 100 returns to the processing of S203. In a case where the suspiciousness degree has been calculated for all the detected persons (Yes in S206), the mask processing unit 150 performs the mask processing on the imaging data (S207). In this operation example, it is assumed that the detection data illustrated in FIG. 3 is stored in the storage device 160, and the suspiciousness degree data illustrated in FIG. 4 is stored in the storage device 160 based on the detection data.

Figure 7:
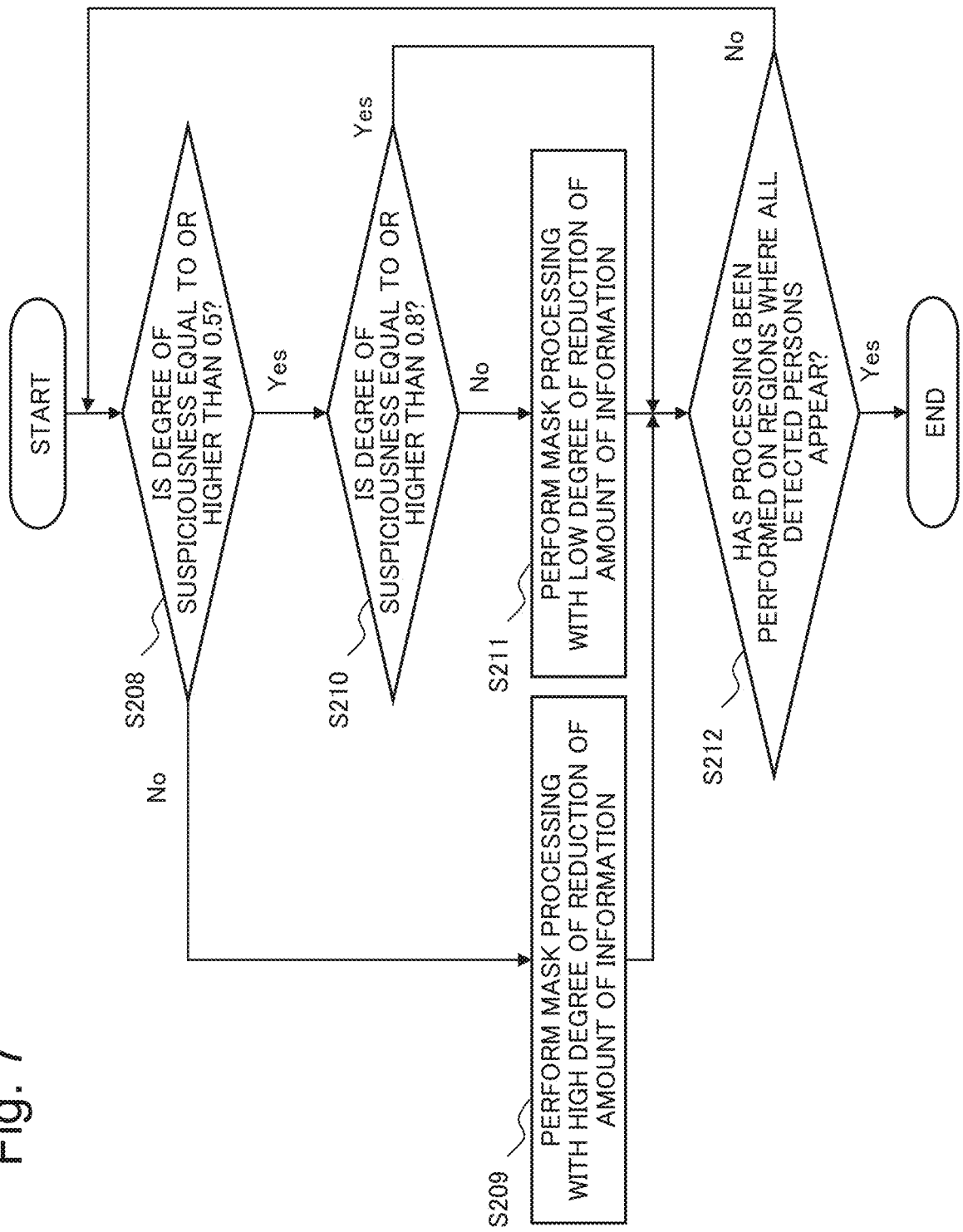
FIG. 7 is a flowchart illustrating an example of mask processing according to the first example embodiment.

FIG. 7 is a flowchart for describing an operation of the mask processing performed by the mask processing unit 150. The mask processing unit 150 reads the suspiciousness degree data from the storage device 160, and performs the mask processing on each region where a person identified with the identification information appears in the imaging data.

First, the mask processing unit 150 determines whether the degree of suspiciousness included in one record of the suspiciousness degree data is equal to or higher than 0.5. In a case where the degree of suspiciousness is lower than 0.5 (No in S208), the mask processing is performed in such a way as to increase the degree of reduction of the amount of information on a region where the person having the identification information associated with the degree of suspiciousness appears (S209). In a case where the degree of suspiciousness is equal to or higher than 0.5 (Yes in S208) and is lower than 0.8 (No in S210), the mask processing with the lower degree of reduction of the amount of information than that of the mask processing performed in S209 is performed on the region where the person having the identification information associated with the degree of suspiciousness appears (S211). In a case where the degree of suspiciousness is equal to or higher than 0.8 (Yes in S210), the mask processing is not performed on the region where the person having the identification information associated with the degree of suspiciousness appears. That is, in a case where the processing has been performed on the region where all the detected persons appear (Yes in S212), the flowchart of FIG. 7 ends. In a case where the processing has not been performed on the region where all the detected persons appear (No in S212), the information processing device 100 returns to the processing of S208.

In this operation example, the mask processing unit 150 performs the mask processing of S207 based on the suspiciousness degree data illustrated in FIG. 4. Therefore, the mask processing is not performed on the region where the person whose identification information is "A" appears, the mask processing of S209 is performed on the region where the person whose identification information is "B" appears, and the mask processing of S211 is performed on the region where the person whose identification information is "C" appears.

FIG. 8A is an example of the imaging data acquired by the information processing device 100 from the imaging device 200 in the operation example according to the first example embodiment. "Person A", "Person B", and "Person C" illustrated in FIG. 8A correspond to the persons whose pieces of identification information are "A", "B", and "C", respectively, illustrated in FIGS. 3 and 4.

FIG. 8B is an example of the processed imaging data obtained by performing the image processing on FIG. 8A in the operation example according to the first example embodiment. FIG. 8B illustrates that the mask processing is not performed on a region where Person A appears. The mask processing with the high degree of reduction of the amount of information is performed on a region where Person B appears. In this operation example, the mask processing unit 150 superimposes another image on the region where Person B appears. As a result, a feature related to Person B does not appear in the processed imaging data. The mask processing with the small degree of reduction of the amount of information is performed on the region where Person C appears. In this operation example, the mask processing unit 150 superimposes another image on the region where Person C appears in such a way that Person C appears through the another transparent image. At this time, the mask processing unit 150 may adjust the degree of transparency of the superimposed image in such a way that the surveillance staff can recognize only the shape of Person C, or may adjust the degree of transparency of the superimposed image in such a way that the surveillance staff can recognize only the color of the clothes or hair of Person C.

Returning to FIG. 5, the information processing device 100 transmits the processed imaging data to the management terminal 300 (S103). Once the processed imaging data is acquired from the information processing device 100, the display unit 310 of the management terminal 300 displays the processed imaging data (S104).

As described above, the information processing device 100 according to the first example embodiment detects an action of a person and an emotion of the person included in imaging data. Then, the information processing device 100 calculates the degree of suspiciousness that is a value indicating the degree of necessity of monitoring of the person based on the detected action of the person and the detected emotion of the person, and performs the mask processing that is processing of reducing the amount of information of a region where the person appears in the imaging data according to the calculated degree of suspiciousness. With this configuration, it is possible to obtain an effect that the information processing device 100 according to the first example embodiment can present a video effective for monitoring a person while protecting privacy.

In the information processing device 100 according to the first example embodiment, since the mask processing is performed on a person other than the monitoring target, the monitoring target can be displayed in a highlighted manner. As a result, it is possible to cause a surveillance staff to efficiently recognize the monitoring target.

The information processing device 100 according to the first example embodiment can change the degree of reduction of the amount of information of the mask processing according to the degree of suspiciousness. Therefore, a surveillance staff can perform monitoring by recognizing only information necessary for monitoring, it is thus possible to prevent invasion of privacy by the surveillance staff to the maximum extent.

First Modified Example

The person detection unit 110 may be included in the imaging device 200. In this case, after the processing of S101, the imaging device 200 performs the processing of S201 and the processing of S202. Then, the imaging device 200 transmits the imaging data and the identification information generated regarding the person appearing in the imaging data to the information processing device 100.

Second Modified Example

The action detection unit 120 may further detect an article carried by the person. For example, in a case where the person carries a knife, the action detection unit 120 stores information indicating that "the person carries a knife" and the identification information in association with each other in the storage device 160 as the detection data.

As described above, the information processing device 100 according to the first example embodiment can detect a person to be monitored more accurately by detecting an article carried by the person.

Second Example Embodiment

Next, a monitoring system including an information processing device according to a second example embodiment will be described.

Figure 9:
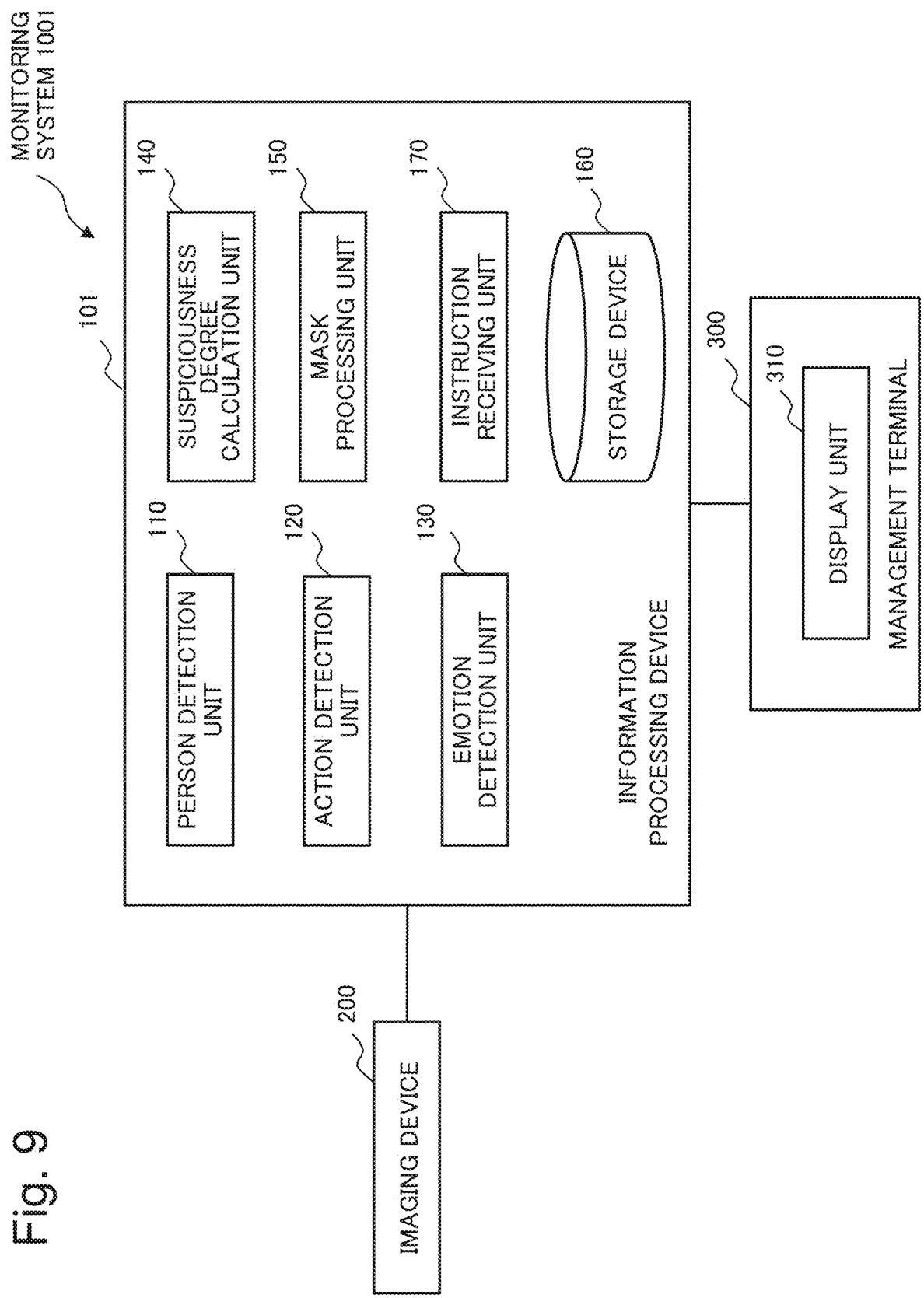
FIG. 9 is a block diagram illustrating an example of a functional configuration of a monitoring system according to a second example embodiment.

FIG. 9 is a block diagram illustrating an example of a configuration of a monitoring system 1001 according to the second example embodiment. As illustrated in FIG. 9, the monitoring system 1001 includes an information processing device 101 instead of the information processing device 100 in the first example embodiment, and is similar to the monitoring system 1000 described in the first example embodiment except for this. That is, the monitoring system 1001 includes the information processing device 101, an imaging device 200, and a management terminal 300. A description of contents regarding the configuration and operation of the monitoring system 1001 illustrated in FIG. 9 overlapping with the description of the first example embodiment will be omitted.

As illustrated in FIG. 9, the information processing device 101 has a configuration in which an instruction receiving unit 170 is further added to the configuration of the information processing device 100 according to the first example embodiment.

For example, it is assumed that a surveillance staff recognizes an abnormality from processed imaging data in which a person who has not been subjected to the mask processing appears, and requests a security guard in the vicinity of the imaging range to take action. Then, when the security guard notifies the surveillance staff that the action has been completed, it is not necessary to keep the person in a state where the mask processing is not performed. In this case, the surveillance staff inputs instruction information to the management terminal 300 in such a way as to perform the mask processing on the person. At this time, the instruction receiving unit 170 receives, from the management terminal 300, the instruction information for performing the mask processing on the person. The instruction information includes information related to the mask processing and identification information of a person to be subjected to the mask processing.

The instruction receiving unit 170 changes the degree of suspiciousness of the person to be subjected to the mask processing according to the received instruction information. Specifically, the degree of suspiciousness relevant to the identification information in the suspiciousness degree data is changed according to the degree of reduction of the amount of information of the mask processing included in the instruction information, based on the degree of reduction of the amount of information of the mask processing included in the received instruction information and the identification information. In this manner, the instruction receiving unit 170 receives the instruction information including an instruction to change the degree of suspiciousness and information for identifying a person whose degree of suspiciousness is to be changed, and changes the degree of suspiciousness based on the received instruction information. The instruction receiving unit 170 is an example of instruction receiving means.

As described above, the information processing device 101 according to the second example embodiment receives the instruction information including an instruction to change the degree of suspiciousness and information for identifying a person whose degree of suspiciousness degree is to be changed. Then, the information processing device 101 performs the mask processing based on the changed degree of suspiciousness on a region where the person whose degree of suspiciousness has been changed according to the instruction information appears. As a result, the information processing device 101 according to the second example embodiment can perform the mask processing as necessary on a region of a person for which the mask processing has not been performed, for example, and thus can protect privacy.

In a case where the degree of reduction of the amount of information of the mask processing included in the instruction information is lower than the degree of reduction of the amount of information of the mask processing at the time when the instruction information is received, the instruction receiving unit 170 may transmit a notification indicating that the instruction cannot received to the management terminal 300. As a result, the degree of artificial reduction of the amount of information of the mask processing cannot be reduced, it is thus possible to further prevent invasion of privacy by a surveillance staff.

The instruction receiving unit 170 may perform control in such a way as to set a flag for a record of the suspiciousness degree data for which the degree of suspiciousness has been controlled according to the instruction, for a predetermined time. Then, the suspiciousness degree calculation unit 140 may not calculate the degree of suspiciousness for the record of the suspiciousness degree data for which the flag has been set. As a result, it is possible to prevent the suspiciousness degree calculation unit 140 from rewriting the degree of suspiciousness in the record for which the degree of suspiciousness has been controlled according to the instruction.

Third Example Embodiment

Next, a monitoring system including an information processing device according to a third example embodiment will be described.

Figure 10:
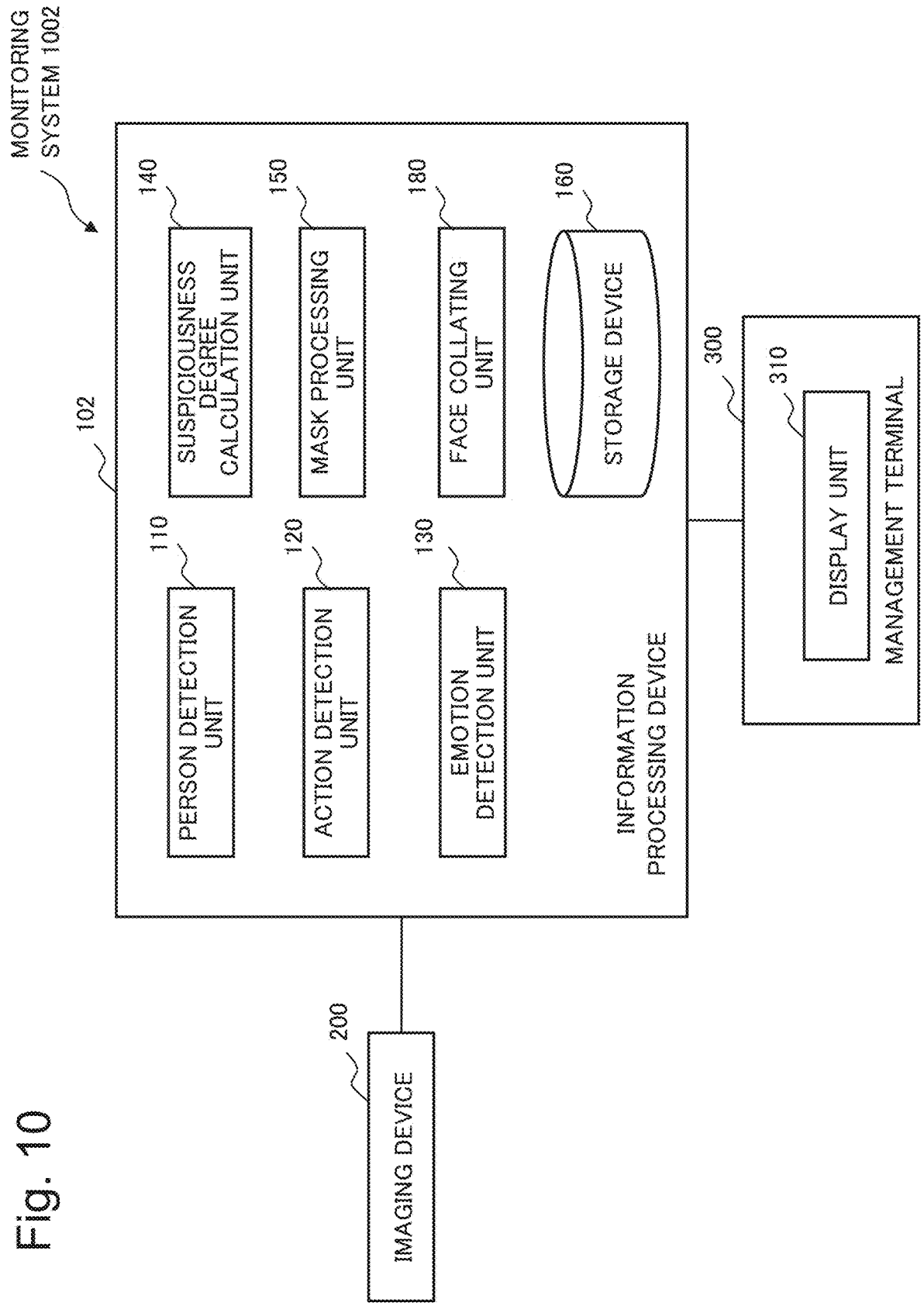
FIG. 10 is a block diagram illustrating an example of a functional configuration of a monitoring system according to a third example embodiment.

FIG. 10 is a block diagram illustrating an example of a configuration of a monitoring system 1002 according to the third example embodiment. As illustrated in FIG. 10, the monitoring system 1002 includes an information processing device 102 instead of the information processing device 100 in the first example embodiment, and is similar to the monitoring system 1000 described in the first example embodiment except for this. That is, the monitoring system 1002 includes the information processing device 102, an imaging device 200, and a management terminal 300. A description of contents regarding the configuration and operation of the monitoring system 1002 illustrated in FIG. 10 overlapping with the description of the first example embodiment will be omitted.

As illustrated in FIG. 10, the information processing device 102 has a configuration in which a face collating unit 180 is further added to the configuration of the information processing device 100 according to the first example embodiment.

The face collating unit 180 collates face information of a person included in imaging data with face information registered in advance. Specifically, the face collating unit 180 extracts a feature amount from a face region of the person detected by a person detection unit 110 in the imaging data. Next, the face collating unit 180 searches for a feature amount that matches the extracted feature amount by using a database that holds feature amounts of faces registered in advance. In a case where the feature amount that matches is included in the database, the face collating unit 180 determines that there is a feature amount that matches. At this time, the database may be stored in a storage device 160 or may be stored in a device (not illustrated) communicably connected to the information processing device 102. In this manner, the face collating unit 180 collates the face information of a person with face information registered in advance in the database. The face collating unit 180 is an example of face collating means.

The face collating unit 180 updates the suspiciousness degree data by setting the degree of suspiciousness of the person determined to match in the collation of the face information to 1. That is, the information processing device 102 does not perform the mask processing on a region where the person appears since the person that matches has a high degree of suspiciousness of 1 in the imaging data.

Next, an operation of the monitoring system 1002 will be described with reference to FIG. 11.

Figure 11:
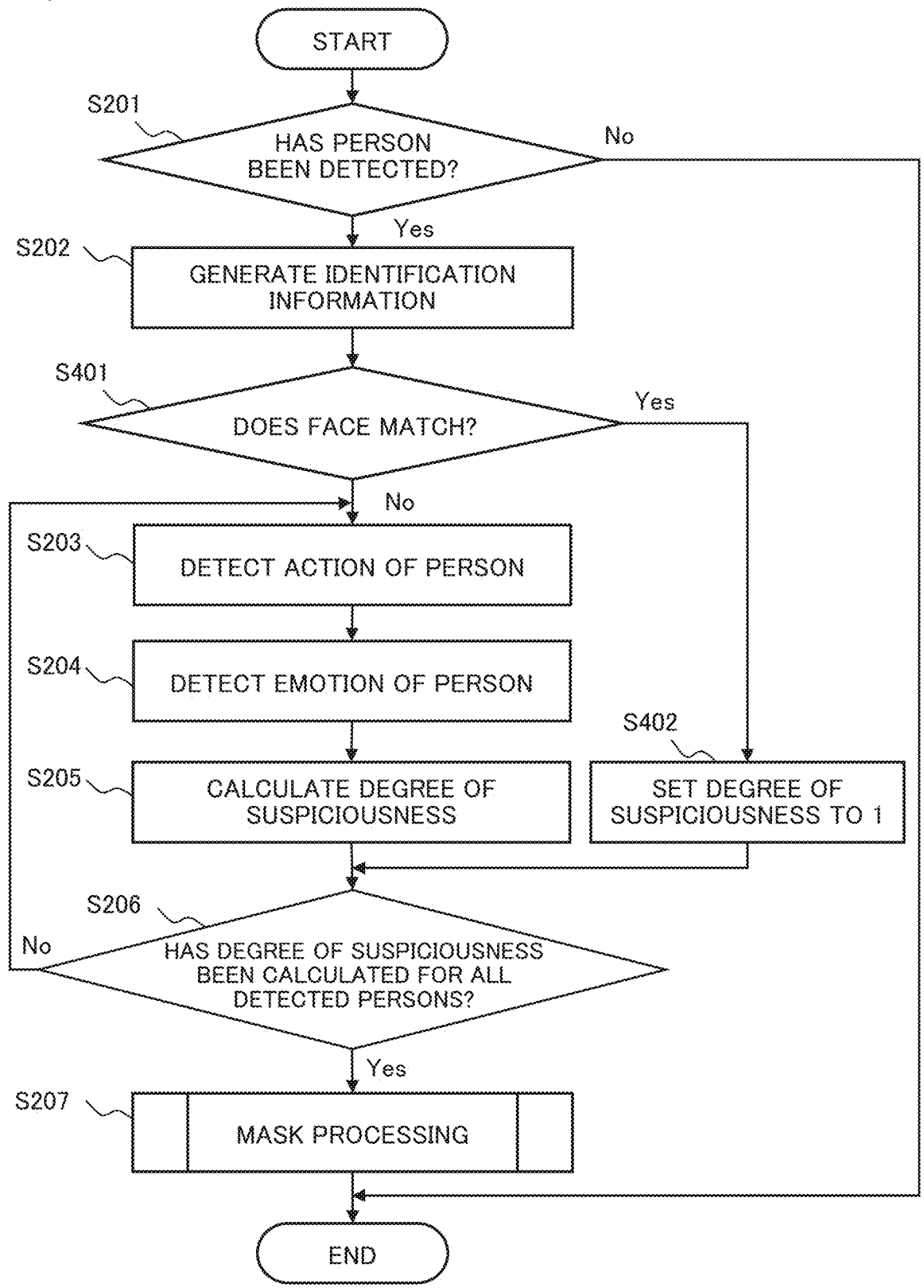
FIG. 11 is a flowchart illustrating an example of image processing according to the third example embodiment.

In the third example embodiment, processing illustrated in FIG. 11 is performed instead of the processing of S102 illustrated in FIG. 5. FIG. 11 is a diagram illustrating an example of a flowchart of image processing according to the third example embodiment. A description of processing similar to that in the flowchart illustrated in FIG. 6 will be omitted.

After the processing of S202, the face collating unit 180 performs face collation for the detected person. In a case where the face of the detected person matches (Yes in S401), the face collating unit 180 sets the degree of suspiciousness relevant to the identification information of the person whose face matches to 1 (S402). In a case where the face of the detected person does not match (No in S401), the processing of S203 is performed.

As described above, in a case where the face information of the detected person matches the face information registered in advance, the information processing device 102 according to the third example embodiment does not perform the mask processing on a region where the person appears in the imaging data. As a result, in a case where a person whose face information is known in advance, such as a wanted person, has been detected, for example, the information processing device 102 can present a video in which the person appears.

In FIG. 10, the information processing device 102 does not include the instruction receiving unit 170 described in the second example embodiment, but the information processing device 102 may include the instruction receiving unit 170. That is, the monitoring system 1002 according to the third example embodiment may be configured to be able to perform processing similar to the processing described in the second example embodiment.

Fourth Example Embodiment

Next, a monitoring system including an information processing device according to a fourth example embodiment will be described.

Figure 12:
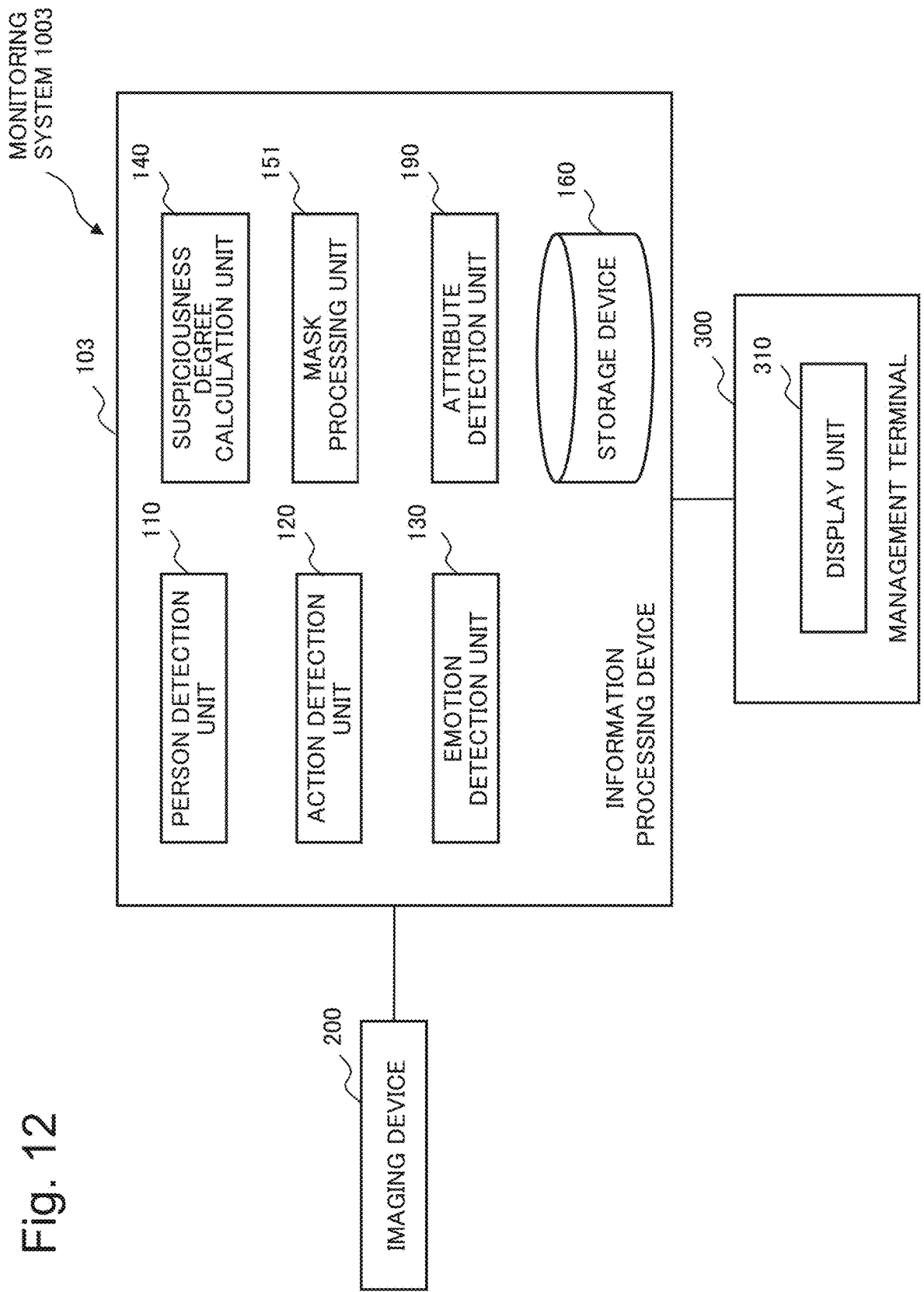
FIG. 12 is a block diagram illustrating an example of a functional configuration of a monitoring system according to a fourth example embodiment.

FIG. 12 is a block diagram illustrating an example of a configuration of a monitoring system 1003 according to the fourth example embodiment. As illustrated in FIG. 12, the monitoring system 1003 includes an information processing device 103 instead of the information processing device 100 in the first example embodiment, and is similar to the monitoring system 1000 described in the first example embodiment except for this. That is, the monitoring system 1003 includes the information processing device 103, an imaging device 200, and a management terminal 300. A description of contents regarding the configuration and operation of the monitoring system illustrated in FIG. 12 overlapping with the description of the first example embodiment will be omitted.

As illustrated in FIG. 12, the information processing device 103 includes a mask processing unit 151 instead of the mask processing unit 150 of the information processing device 100 according to the first example embodiment, and further includes an attribute detection unit 190.

The attribute detection unit 190 detects the attribute of a person included in imaging data. Here, the attribute of the person is, for example, the sex, the age, the posture, the clothes, and the walking speed of the person, but is not limited thereto. As described above, the attribute detection unit 190 detects the attribute of the person from the imaging data. The attribute detection unit 190 is an example of attribute detection means.

The attribute detection unit 190 detects the attribute of each detected person, and stores the attribute of the detected person and the identification information of the person in association with each other in a storage device 160 as detection data.

FIG. 13 is a diagram illustrating an example of the detection data according to the fourth example embodiment. The detection data illustrated in FIG. 13 is data in which the identification information, information indicating an action of the person, information indicating an emotion of the person, and information indicating the attribute of the person are associated with each other. For example, a record in the first row of FIG. 13 indicates detection data indicating that a person whose identification information is "A" is a "female" of "under the age of 10".

The mask processing unit 151 performs the mask processing based on the degree of suspiciousness and the detected attribute. Specifically, the mask processing unit 151 performs the mask processing in such a way that information on the detected attribute can be recognized from processed imaging data. In a case where a person included in the imaging data is a male in his or her thirties, the mask processing unit 151 performs the mask processing by, for example, superimposing an avatar image to which information indicating "thirties" and "male" has been added, on a region where the person appears. Such an avatar image based on the attribute is stored in advance in the storage device 160. The information to be added may be selected according to the degree of suspiciousness. The mask processing of superimposing an avatar image may be performed on a person selected based on the degree of suspiciousness, instead of being performed on all persons detected from the imaging data.

Next, an operation of the monitoring system 1003 will be described with reference to FIGS. 14 and 15.

Figure 14:
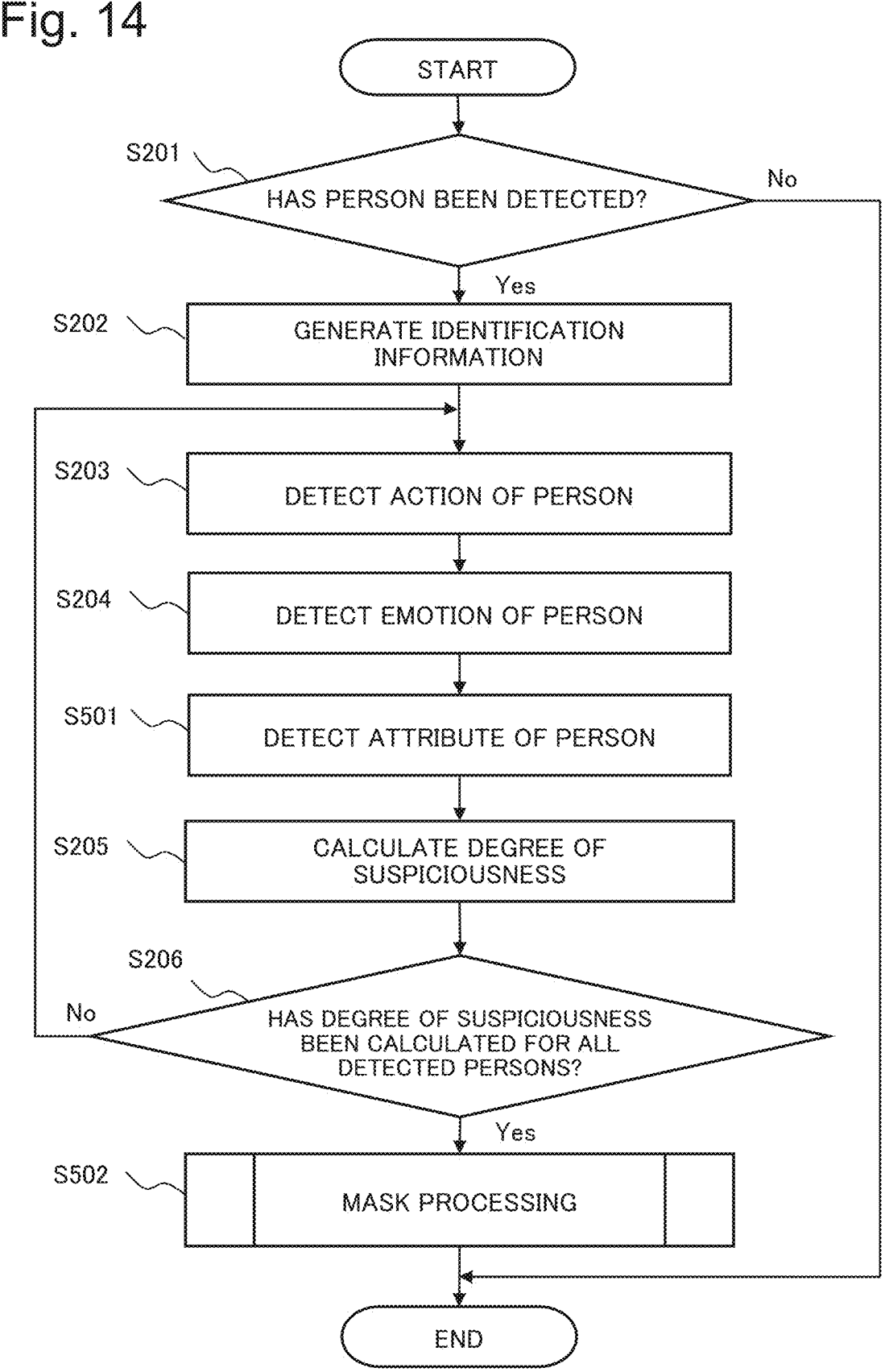
FIG. 14 is a flowchart for describing an example of image processing according to the fourth example embodiment.
Figure 15:
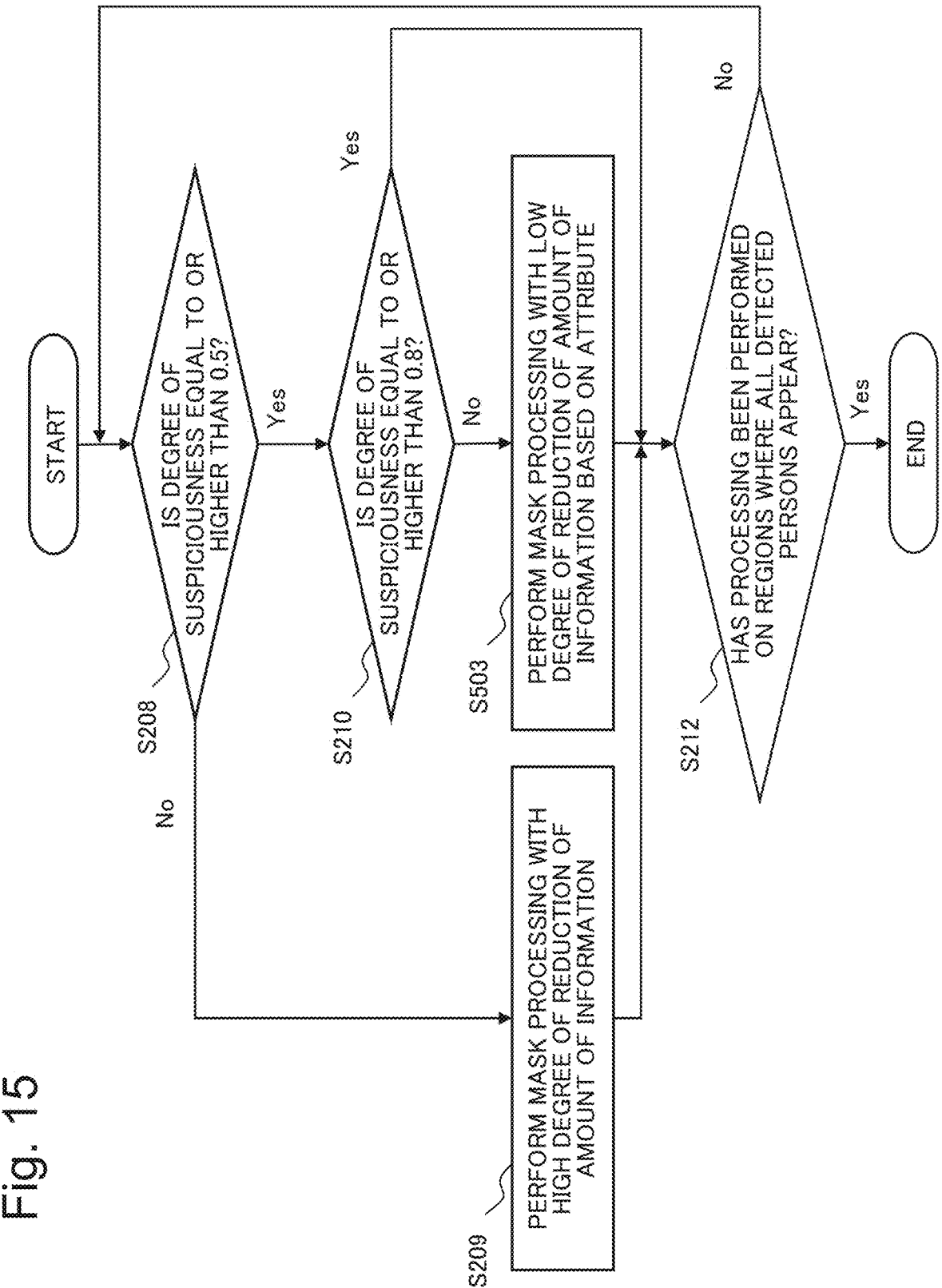
FIG. 15 is a flowchart illustrating an example of mask processing according to the fourth example embodiment.

In the fourth example embodiment, processing illustrated in FIGS. 14 and 15 is performed instead of the processing of S102 illustrated in FIG. 6. A description of processing similar to that in the flowchart illustrated in FIGS. 6 and 7 will be omitted.

FIG. 14 is a diagram illustrating an example of a flowchart of image processing according to the fourth example embodiment. As illustrated in FIG. 14, after the processing of S204, the attribute detection unit 190 detects the attribute of each detected person from the imaging data (S501). Then, the attribute detection unit 190 stores the detected attribute, information indicating an action of the person, information indicating an emotion of the person, and the identification information in the storage device 160 as the detection data in association with each other. In this operation example, it is assumed that the detection data illustrated in FIG. 13 and the suspiciousness degree data illustrated in FIG. 4 are stored in the storage device 160.

In a case where the degree of suspiciousness has been calculated for all the detected persons (Yes in S206), the mask processing unit 151 performs the mask processing as follows (S502).

FIG. 15 is a diagram illustrating an example of a flowchart of the mask processing according to the fourth example embodiment. As illustrated in FIG. 15, in a case where the degree of suspiciousness is equal to or higher than 0.5 (Yes in S208) and the degree of suspiciousness is lower than 0.8 (No in S210), the mask processing unit 151 performs the mask processing of decreasing the amount of information based on the attribute (S503). In this operation example, in the suspiciousness degree data illustrated in FIG. 4, a person whose identification information is "C" has the degree of suspiciousness equal to or higher than 0.5 and lower than 0.8. The person whose identification information is "C" is a person whose age is "thirties" and sex is "male" as illustrated in FIG. 13. Therefore, the mask processing unit 151 superimposes an avatar to which information indicating "thirties" and information indicating "male" are added on a region where the person whose identification information is "C" appears. At this time, the mask processing unit 151 may add information on the age and sex by changing the color of the avatar or adding text to the avatar, for example.

As described above, the information processing device 103 according to the fourth example embodiment detects the attribute of a person included in imaging data, and performs the mask processing based on the detected attribute. As a result, the information processing device 103 can present processed imaging data in which the attribute information is added to an avatar, for example, and thus, it is possible to prevent invasion of privacy by a surveillance staff even for a person subjected to a low level of mask processing.

Third Modified Example

For example, in a case where it is detected that a person under the age of 10 is wandering, there is a possibility that the person is a monitoring target. Therefore, the suspiciousness degree calculation unit 140 may calculate the degree of suspiciousness by using information on the attribute of the detected person in addition to information on an action and an emotion of the detected person.

For example, in a case where the imaging range is a public road and the imaging data generated at 3:00 AM includes a person in his/her teens, there is a possibility that the person is a monitoring target. Therefore, the suspiciousness degree calculation unit 140 may calculate the degree of suspiciousness by using time information in addition to information on an action of the person, information on an emotion of the person, and information on the attribute of the person. At this time, the time information may be included in the imaging data transmitted from the imaging device 200 to the information processing device 103.

In FIG. 12, the information processing device 103 does not include the instruction receiving unit 170 described in the second example embodiment and the face collating unit 180 described in the third example embodiment, but the information processing device 103 may include the instruction receiving unit 170 and the face collating unit 180. That is, the monitoring system 1003 according to the fourth example embodiment may be configured to be able to perform processing similar to the processings described in the second example embodiment and the third example embodiment.

Fifth Example Embodiment

Next, a monitoring system including an information processing device according to a fifth example embodiment will be described.

Figure 16:
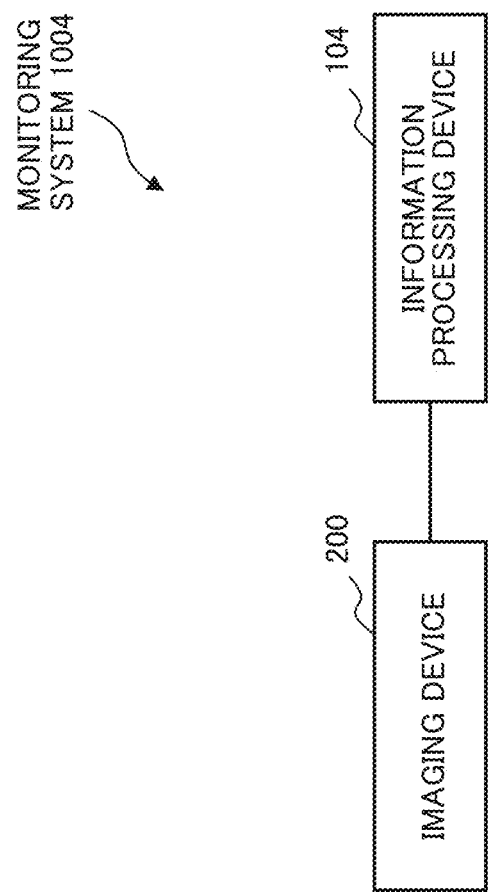
FIG. 16 is a block diagram illustrating an example of a configuration of a monitoring system according to a fifth example embodiment.

FIG. 16 is a block diagram illustrating an example of a configuration of a monitoring system 1004 according to the fifth example embodiment. As illustrated in FIG. 16, the monitoring system 1004 includes an information processing device 104 and an imaging device 200. A description of contents regarding the configuration and operation of the monitoring system 1004 illustrated in FIG. 16 overlapping with the description of the first example embodiment will be omitted.

The imaging device 200 generates imaging data by imaging an imaging range.

Figure 17:
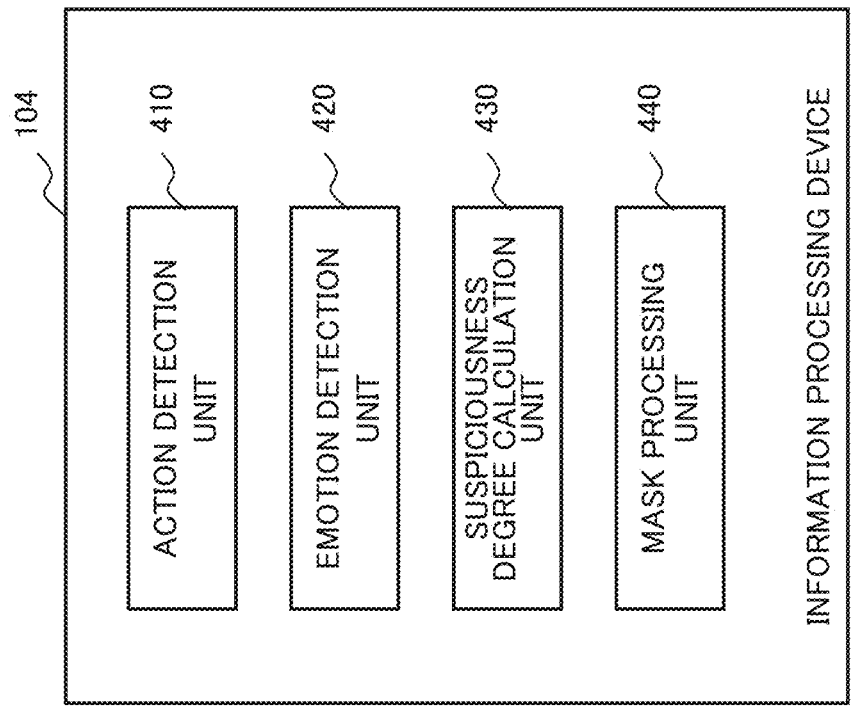
FIG. 17 is a block diagram illustrating an example of a functional configuration of an information processing device according to the fifth example embodiment.

FIG. 17 is a block diagram illustrating an example of a functional configuration of the information processing device 104 according to the fifth example embodiment. As illustrated in FIG. 17, the information processing device 104 includes an action detection unit 410, an emotion detection unit 420, a suspiciousness degree calculation unit 430, and a mask processing unit 440.

The action detection unit 410 detects an action of a person included in the imaging data from the imaging data.

The emotion detection unit 420 detects an emotion of the person included in the imaging data from the imaging data.

The suspiciousness degree calculation unit 430 calculates the degree of suspiciousness of the person based on the detected action and emotion of the person.

The mask processing unit 440 performs the mask processing on a region where the person appears in the imaging data based on the calculated degree of suspiciousness.

Figure 18:
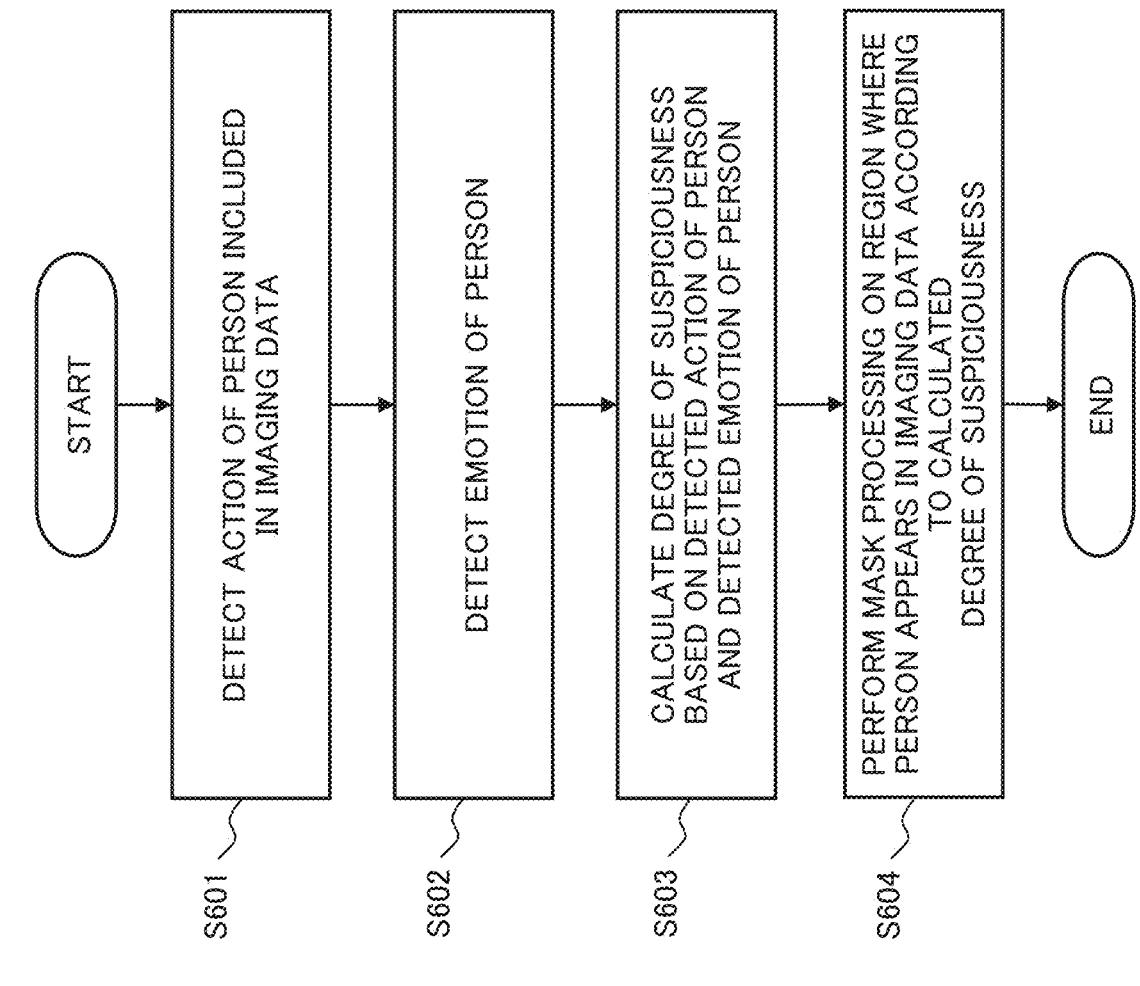
FIG. 18 is a flowchart illustrating an example of an operation of the information processing device according to the fifth example embodiment.

Next, an operation of the information processing device 104 will be described with reference to FIG. 18. FIG. 18 is a flowchart for describing the operation of the information processing device 104. The operation illustrated in FIG. 18 is an operation performed instead of the processing of S102 in FIG. 18 in the first example embodiment.

The action detection unit 410 detects an action of a person included in imaging data by using the imaging data generated by the imaging device 200 (S601).

The emotion detection unit 420 detects an emotion of the person included in the imaging data by using the imaging data generated by the imaging device 200 (S602).

The suspiciousness degree calculation unit 430 calculates the degree of suspiciousness of the person based on the action of the person detected by the action detection unit 410 and the emotion of the person detected by the emotion detection unit 420 (S603).

The mask processing unit 440 performs the mask processing on a region where the person appears in the imaging data based on the degree of suspiciousness calculated by the suspiciousness degree calculation unit 430 (S604).

As described above, the information processing device 104 according to the fifth example embodiment detects an action of a person and an emotion of the person included in imaging data. Then, the information processing device 104 calculates the degree of suspiciousness of the person based on the detected action and emotion of the person, and performs the mask processing on a region where the person appears in the imaging data according to the calculated degree of suspiciousness. With this configuration, it is possible to obtain an effect that the information processing device 104 according to the fifth example embodiment can present an effective video when monitoring a person while protecting privacy.

The first, second, third, fourth, and fifth example embodiments described above can be implemented by being appropriately combined.

Example of Hardware Configuration of Information Processing Device

Figure 19:
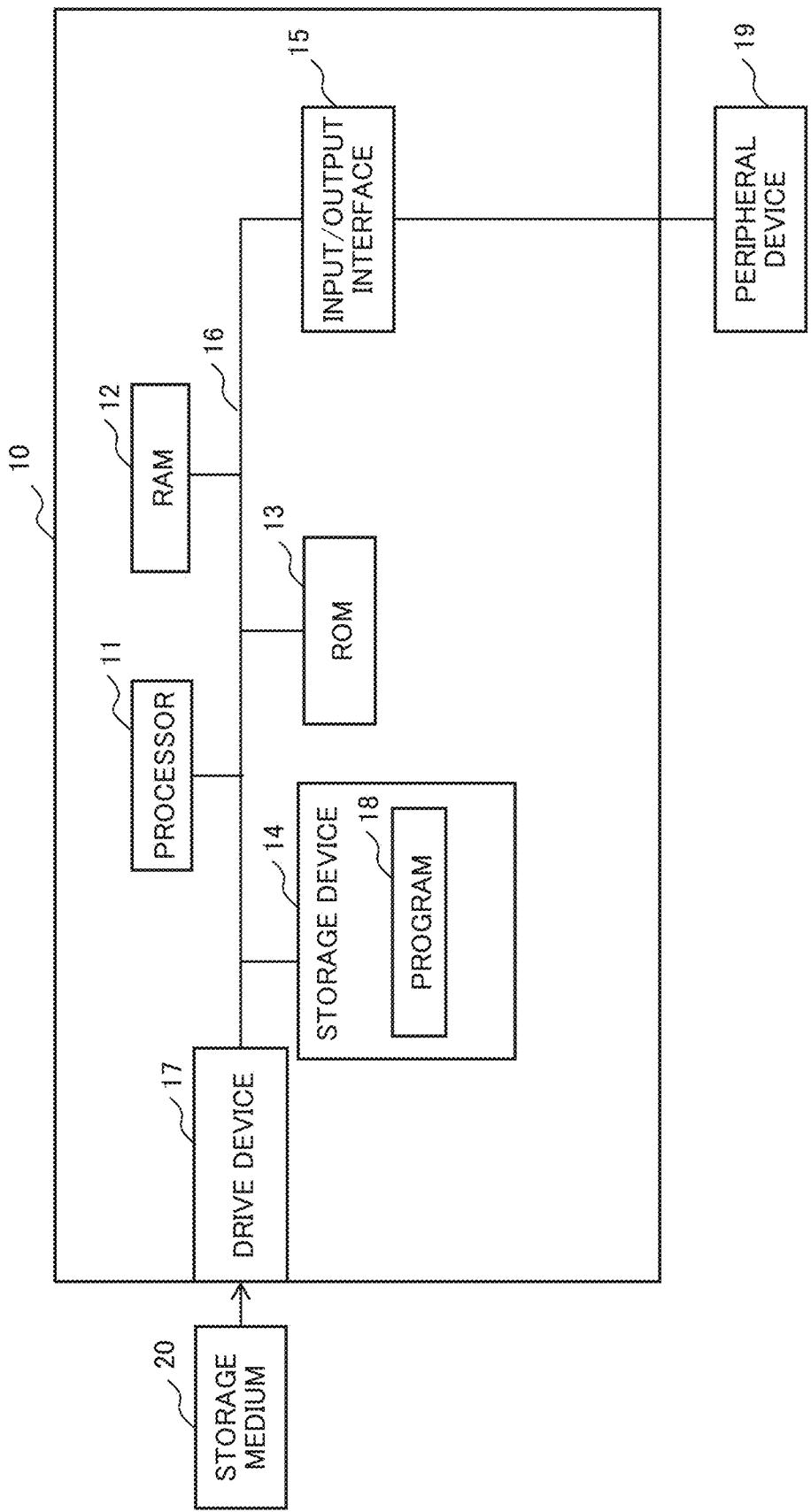
FIG. 19 is a block diagram illustrating an example of a hardware configuration of a computer device that implements the information processing devices according to the first, second, third, fourth, and fifth example embodiments.

Hardware implementing the information processing devices according to the first, second, third, fourth, and fifth example embodiments will be described. FIG. 19 is a block diagram illustrating an example of a hardware configuration of a computer device that implements the information processing device according to each example embodiment. Each block illustrated in FIG. 19 can be implemented by a combination of a computer device 10 that implements the information processing device and the information processing method according to each example embodiment and software.

As illustrated in FIG. 19, the computer device 10 includes a processor 11, a random access memory (RAM) 12, a read only memory (ROM) 13, a storage device 14, an input/output interface 15, a bus 16, and a drive device 17.

The storage device 14 stores a program (computer program) 18. The processor 11 executes the program 18 related to the information processing device by using the RAM 12. Specifically, for example, the program 18 includes a program that causes a computer to execute the processings illustrated in FIGS. 5, 6, 7, 11, 14, 15, and 18. In response to the processor 11 executing the program 18, the functions of the respective components (the action detection unit 120 and 410, the emotion detection units 130 and 420, the suspiciousness degree calculation units 140 and 430, the mask processing units 150, 151, and 440, and the like described above) of the information processing devices are implemented. The program 18 may be stored in the ROM 13. The program 18 may be recorded in a storage medium 20 and read using the drive device 17, or may be transmitted from an external device (not illustrated) to the computer device 10 via a network (not illustrated).

The input/output interface 15 exchanges data with a peripheral device (a keyboard, a mouse, a display device, or the like) 19. The input/output interface 15 functions as means configured to acquire or output data. The bus 16 connects the components.

There are various modifications of the method for implementing the information processing device. For example, the information processing device can be implemented as a dedicated device. The information processing device can be implemented by a combination of a plurality of devices.

A processing method, in which a program for implementing each functional component according to each example embodiment is recorded in a storage medium, and the program recorded in the storage medium is read as a code and executed by a computer, also falls within the scope of each example embodiment. That is, a computer-readable storage medium also falls within the scope of each example embodiment. A storage medium in which the above-described program is recorded and the program itself are also included in each example embodiment.

The storage medium is, for example, a floppy (registered trademark) disk, a hard disk, an optical disk, a magneto-optical disk, a compact disc (CD)-ROM, a magnetic tape, a nonvolatile memory card, or a ROM, but is not limited to this example. The program recorded in the storage medium is not limited to a program that performs processing alone, and programs that operate on an operating system (OS) to perform processing in cooperation with other software and functions of an expansion board also fall within the scope of each example embodiment.

The present disclosure has been described above with reference to the above-described example embodiments. However, the present disclosure is not limited to the above-described example embodiments. That is, in the scope of the present disclosure, various aspects that can be understood by those skilled in the art, such as various combinations or selections of the various disclosed elements, can be applied.

This application is based upon and claims the benefit of priority from Japanese patent application No. 2020-048579, filed on Mar. 19, 2020, the disclosure of which is incorporated herein in its entirety by reference.

[Reference signs List]

10 Computer device
11 Processor
12 RAM
13 ROM
14, 160 Storage device
15 Input/output interface
16 Bus
17 Drive device
18 Program
19 Peripheral device
20 Storage medium
100, 101, 102, 103, 104 Information processing device
120, 410 Action detection unit
130, 420 Emotion detection unit
140, 430 Suspiciousness degree calculation unit
150, 151, 440 Masking processing unit
170 Instruction receiving unit
180 Face collating unit
190 Attribute detection unit
200 Imaging device
300 Management terminal
310 Display unit

What is claimed is:

1. An information processing device comprising:
a memory; and
at least one processor coupled to the memory,
the at least one processor being configured to perform operations to:
   detect an action of a person included in imaging data;
   detect an emotion of the person;
   calculate a degree of suspiciousness being a value indicating a degree of necessity of monitoring the person, based on the detected action and the detected emotion of the person; and
   perform, based on the calculated degree of suspiciousness, mask processing of reducing an amount of information of a region where the person appears in the imaging data, the mask processing including superimposing another image on the region, a degree of transparency of the another image being adjusted so at least one of a color of clothes of the person or a color of hair of the person is able to be recognized.

2. The information processing device according to claim 1, wherein the at least one processor is further configured to perform the operations to:
   decrease a degree of reduction of the amount of information of the region where the person appears in a case where the degree of suspiciousness is equal to or higher than a predetermined value to be lower than that in a case where the degree of suspiciousness is lower than the predetermined value.

3. The information processing device according to claim 1, wherein the at least one processor is further configured to perform the operations to:
   receive instruction information including an instruction to change the degree of suspiciousness and information for identifying the person whose degree of suspiciousness is to be changed, and
   in a case where the instruction information is received, perform the mask processing based on the changed degree of suspiciousness on the region.

4. The information processing device according to claim 1, wherein the at least one processor is further configured to perform the operations to:
   collate face information of the person with face information registered in advance in a database, and
   do not perform the mask processing on the region in a case where the face information of the person matches the face information registered in advance in the collation.

5. The information processing device according to claim 1, wherein the at least one processor is further configured to perform the operations to:
   detect an attribute of the person, and
   calculate the degree of suspiciousness of the person based on the detected action of the person, the detected emotion of the person, and the detected attribute of the person.

6. The information processing device according to claim 5, wherein the at least one processor is further configured to perform the operations to:
   perform the mask processing with additional information indicating the attribute of the person based on the detected attribute of the person.

7. An information processing method comprising:
detecting an action of a person included in imaging data;
detecting an emotion of the person;
calculating a degree of suspiciousness indicating a degree of necessity of monitoring the person, based on the detected action and the detected emotion of the person; and performing, based on the calculated degree of suspiciousness, mask processing of reducing an amount of information of a region where the person appears in the imaging data, the mask processing including superimposing another image on the region, a degree of transparency of the another image being adjusted so at least one of a color of clothes of the person or a color of hair of the person is able to be recognized.

8. A non-transitory computer-readable storage medium storing a program for causing a computer to execute:
  detecting an action of a person included in imaging data;
  detecting an emotion of the person;
  calculating a degree of suspiciousness indicating a degree of necessity of monitoring the person, based on the detected action and the detected emotion of the person; and
  performing, based on the calculated degree of suspiciousness, mask processing of reducing an amount of information of a region where the person appears in the imaging data, the mask processing including superimposing another image on the region, a degree of transparency of the another image being adjusted so at least one of a color of clothes of the person or a color of hair of the person is able to be recognized.

* * * * *